(12) United States Patent
Motohashi

(10) Patent No.: US 12,380,639 B2
(45) Date of Patent: Aug. 5, 2025

(54) THREE-DIMENSIONAL SHAPE GENERATION APPARATUS, THREE-DIMENSIONAL SHAPE GENERATION SYSTEM, THREE-DIMENSIONAL SHAPE GENERATION METHOD, AND NON-TRANSITORY RECORDING MEDIUM

(71) Applicant: Naoki Motohashi, Kanagawa (JP)

(72) Inventor: Naoki Motohashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 240 days.

(21) Appl. No.: 18/070,519

(22) Filed: Nov. 29, 2022

(65) Prior Publication Data
US 2023/0222729 A1    Jul. 13, 2023

(30) Foreign Application Priority Data

Jan. 13, 2022 (JP) .................................. 2022-003698

(51) Int. Cl.
*G06T 17/00* (2006.01)

(52) U.S. Cl.
CPC .......... *G06T 17/00* (2013.01); *G06T 2200/24* (2013.01); *G06T 2210/56* (2013.01)

(58) Field of Classification Search
CPC .. G06T 17/00; G06T 2200/24; G06T 2210/56
See application file for complete search history.

(56) References Cited

U.S. PATENT DOCUMENTS

| 10,957,442 | B2 | 3/2021 | Kalafut et al. |
| 2016/0217225 | A1 | 7/2016 | Bell et al. |
| 2016/0232259 | A1 | 8/2016 | Williams et al. |

FOREIGN PATENT DOCUMENTS

| EP | 0 895 577 B1 | 4/2005 |
| JP | 2019-091393 | 6/2019 |
| JP | 2020-197979 | 12/2020 |
| JP | 2021-030360 | 3/2021 |

(Continued)

OTHER PUBLICATIONS

Extended European Search Report issued Jun. 6, 2023 in European Patent Application No. 22207298.5, 12 pages.

*Primary Examiner* — Michelle L Sams
(74) *Attorney, Agent, or Firm* — XSENSUS LLP

(57) ABSTRACT

A three-dimensional shape generation apparatus includes circuitry configured to perform one of a first processing or a second processing to generate three-dimensional shape information using point-group information indicating three-dimensional point groups as a generation processing based on an instruction operation received at an instruction reception screen, the instruction operation designating one of the first processing or the second processing. The circuitry performs all processes or a part of processes of the generation processing based on an operation input received at the instruction reception screen in response to the instruction operation designating the first processing. The circuitry performs all processes of the generation processing using a stored processing previously stored in a memory without using the operation input received at the instruction reception screen in response to the instruction operation designating the second processing.

14 Claims, 17 Drawing Sheets

(56) References Cited

FOREIGN PATENT DOCUMENTS

| JP | 2022-147012 | 10/2022 | | |
|----|-------------|---------|---|---|
| JP | 2022-147124 | 10/2022 | | |
| JP | 2022-151477 | 10/2022 | | |
| WO | WO-2018164429 A1 * | 9/2018 | ........... | A61B 18/203 |

* cited by examiner

FIG. 4

| USER ID | TABLE FOR PROCESSING | | | POINT-GROUP DATA |
|---|---|---|---|---|
| 1 | EXECUTION SEQUENCE | PROCESSING | MODE | XXXXXX |
| | 2 | NOISE REMOVAL | AUTOMATIC | XXXXXX |
| | 1 | REGISTRATION | MANUAL | XXXXXX |
| | 3 | SEGMENTATION | MIXED MODE | |
| | 4 | MODELING | AUTOMATIC | |
| 2 | EXECUTION SEQUENCE | PROCESSING | MODE | XXXXXX |
| | 1 | NOISE REMOVAL | MANUAL | XXXXXX |
| | 3 | SEGMENTATION | AUTOMATIC | XXXXXX |
| | 4 | MODELING | MANUAL | |
| | 2 | REGISTRATION | MIXED MODE | |

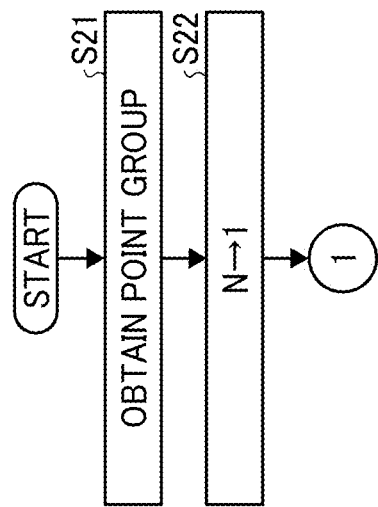

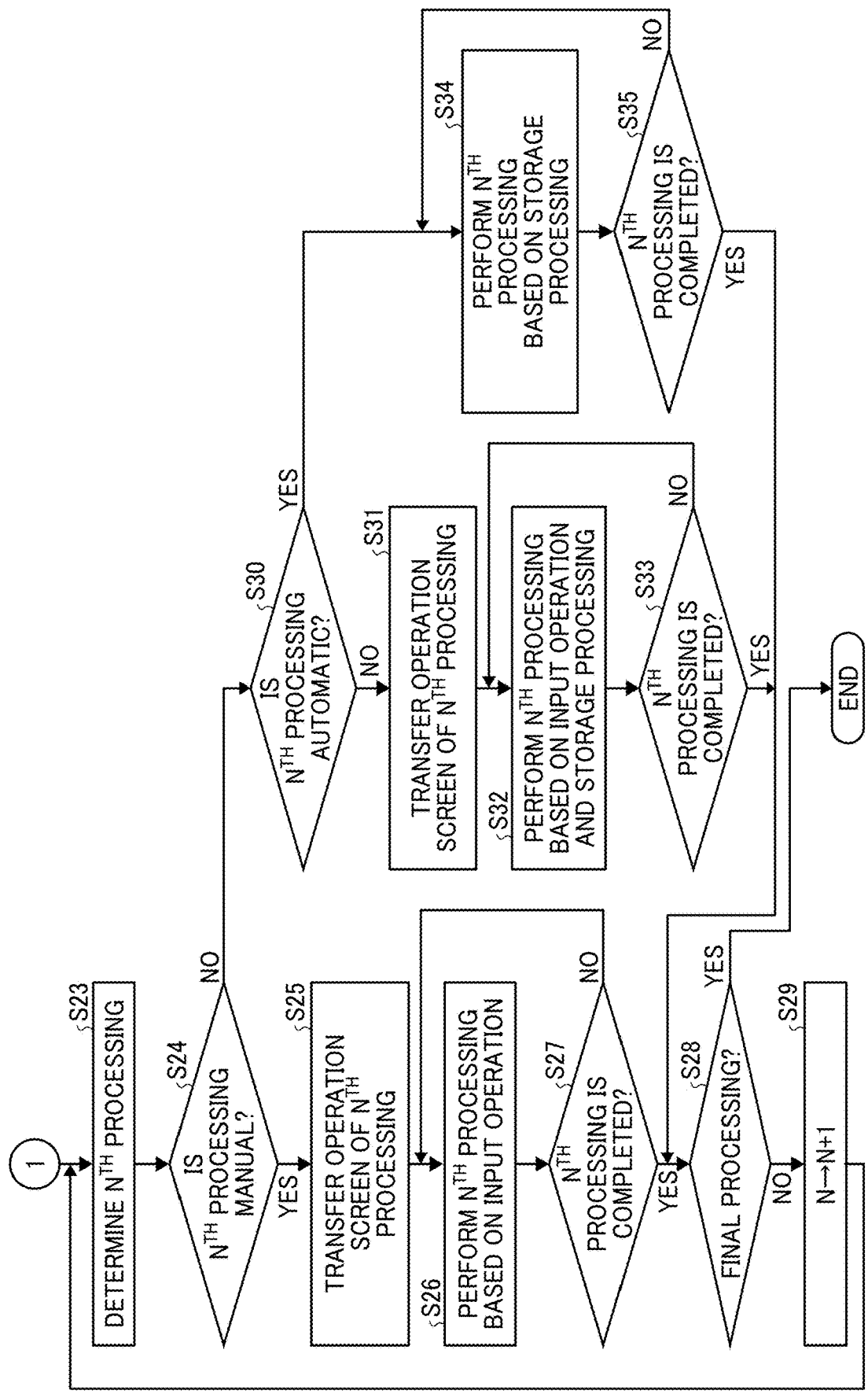

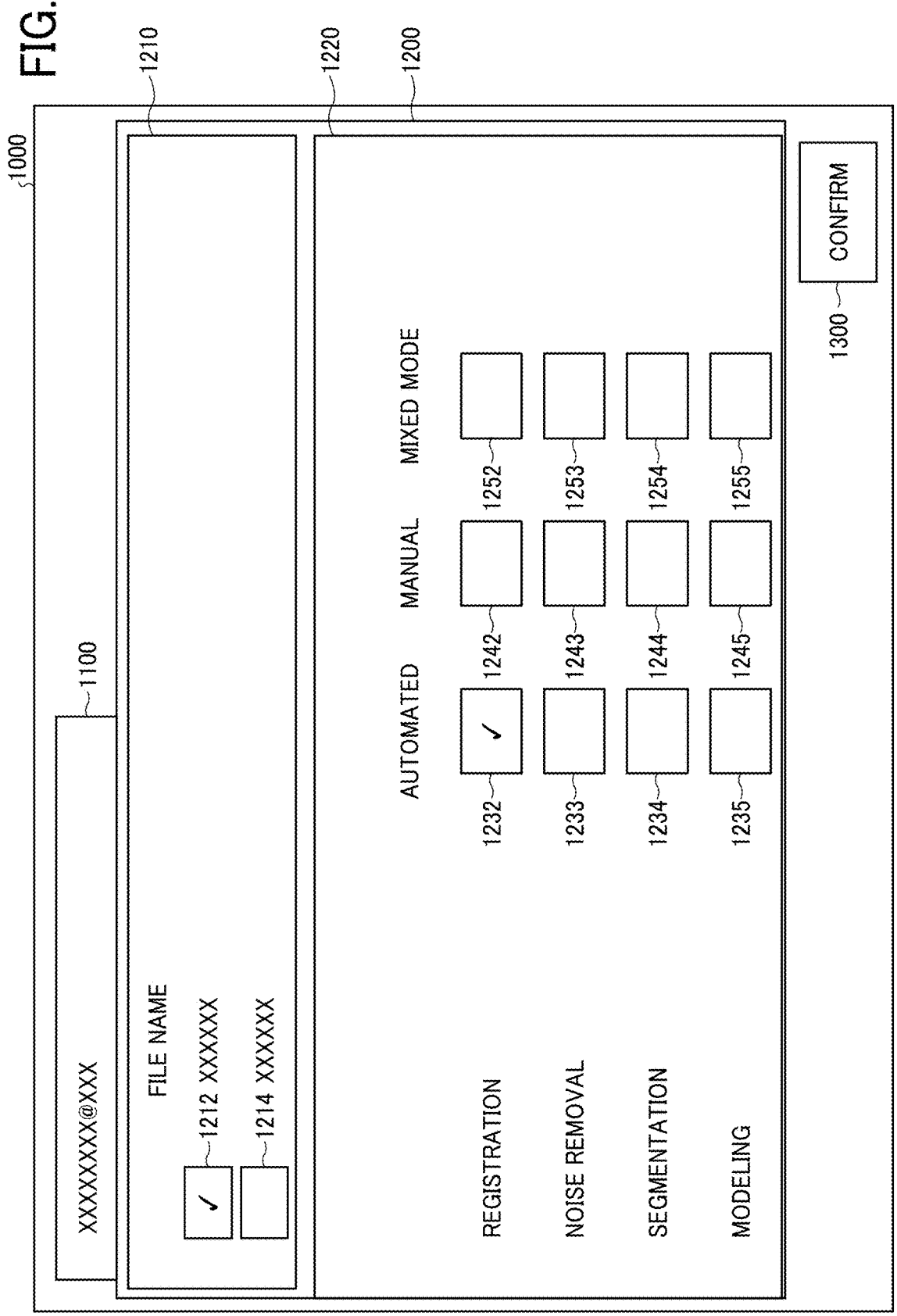

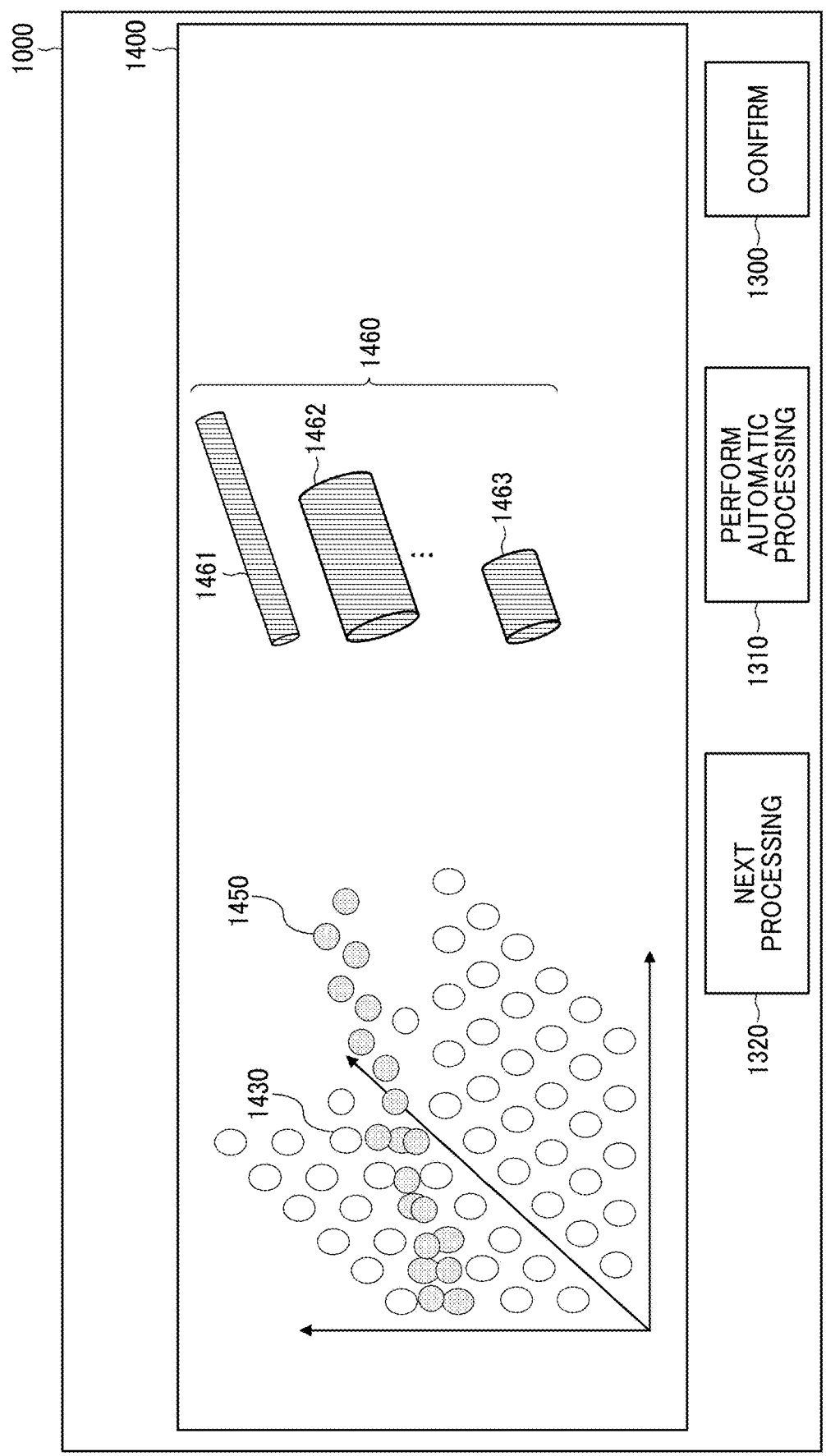

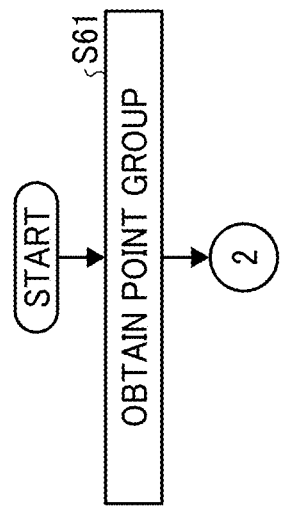

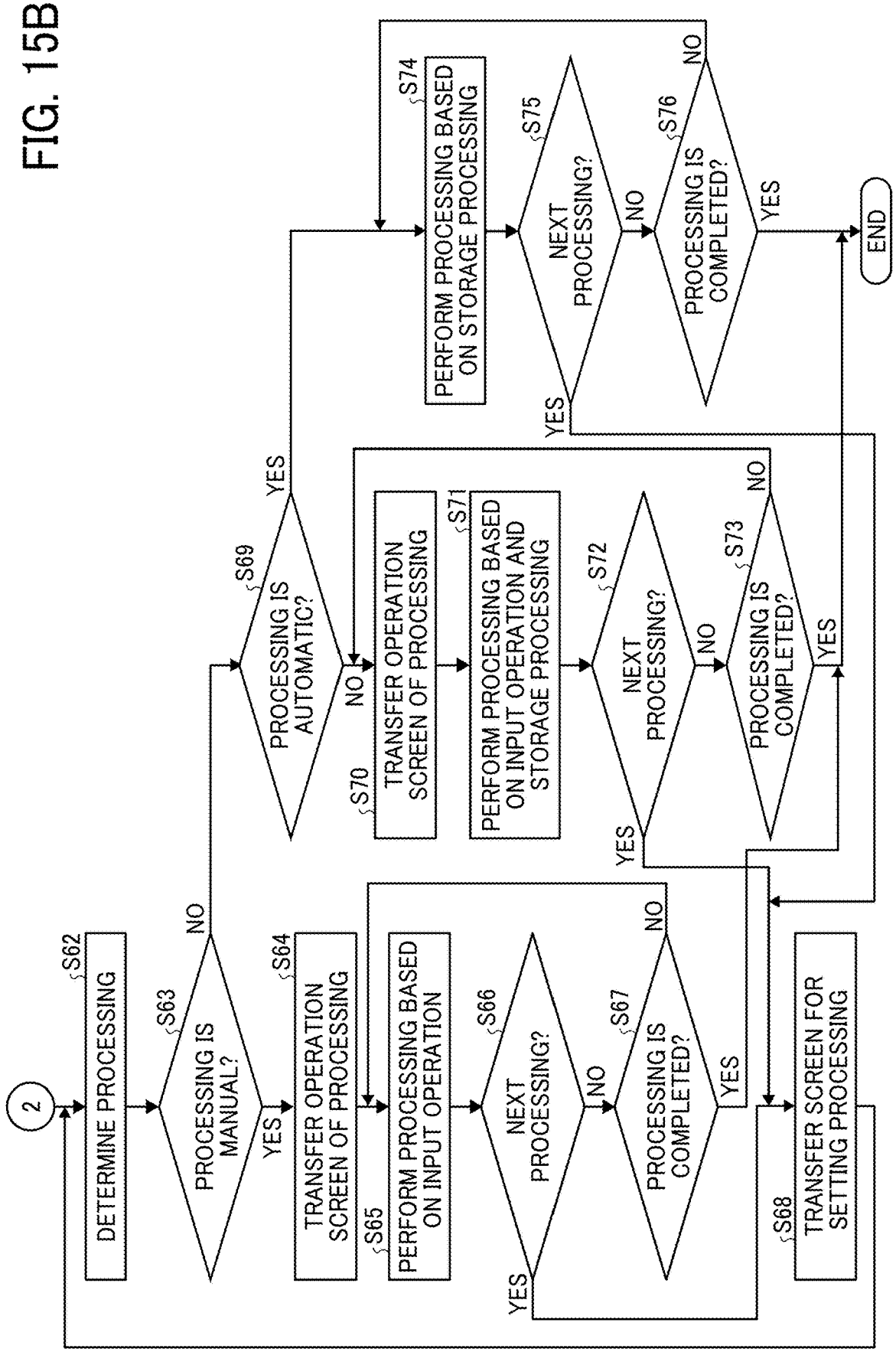

THREE-DIMENSIONAL SHAPE GENERATION APPARATUS, THREE-DIMENSIONAL SHAPE GENERATION SYSTEM, THREE-DIMENSIONAL SHAPE GENERATION METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-003698, filed on Jan. 13, 2022, in the Japan Patent Office, the entire disclosure of which is hereby incorporated by reference herein.

BACKGROUND

Technical Field

The present disclosure relates to a three-dimensional shape generation apparatus, a three-dimensional shape generation system, a three-dimensional shape generation method, and a non-transitory storing medium.

Related Art

A three-dimensional model generation apparatus has been developed to generate a three-dimensional model having at least an outer shape of an object based on three-dimensional point group data of the object. The three-dimensional model generation apparatus includes an abstraction three-dimensional model acquisition unit and a three-dimensional model determination unit. The abstraction three-dimensional model acquisition unit acquires an abstraction three-dimensional model, whose dimension is changeable and which has an outer shape corresponding to each outer shape of the object. The three-dimensional model determination unit determines a matching degree between the three-dimensional point group data and the abstraction three-dimensional model while changing the dimension of the abstraction three-dimensional model and determines, as the three-dimensional model, an abstraction three-dimensional model having a high matching degree.

SUMMARY

An embodiment of the present disclosure provides a three-dimensional shape generation apparatus includes circuitry configured to perform one of a first processing or a second processing to generate three-dimensional shape information using point-group information indicating three-dimensional point groups as a generation processing based on an instruction operation received at an instruction reception screen, the instruction operation designating one of the first processing or the second processing. The circuitry performs all processes or a part of processes of the generation processing based on an operation input received at the instruction reception screen in response to the instruction operation designating the first processing. The circuitry performs all processes of the generation processing using a stored processing previously stored in a memory without using the operation input received at the instruction reception screen in response to the instruction operation designating the second processing.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a conceptual diagram of a setting information management table according to an embodiment of the present disclosure;

FIGS. 7A and 7B indicate a flowchart of a process of generating a three-dimensional shape according to an embodiment of the present disclosure;

FIG. 13 is an illustration of a display screen according to another modification of an embodiment of the present disclosure:

FIG. 14 is an illustration of a modeling process according to another modification of an embodiment of the present disclosure; and FIGS. 15A and 15B indicate a flowchart of a process of generating a three-dimensional shape according to a second modification of an embodiment of the present disclosure.

Figure 1:
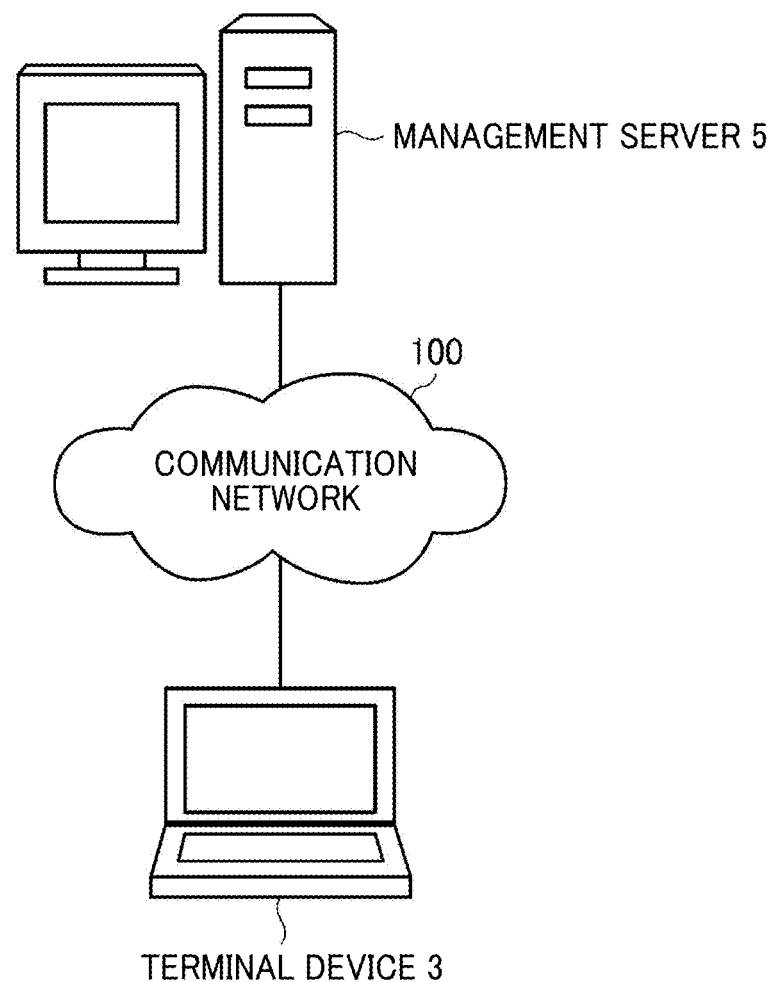
FIG. 1 is a schematic diagram of an overview of a three-dimensional shape generation system according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure achieves appropriate generation of three-dimensional shape information according to a user's level of skill and knowledge.

Building information modeling (BIM) and construction information modeling (CIM) have been developed in industries such as civil engineering and construction to deal with declining birthrate and a growing proportion of elderly people and increases increase labor productivity.

BIM is an abbreviation of Building Information Modeling, which is a solution for utilizing information in all processes from the design and construction to the maintenance and management of the building, the information involving database of the building in which attribute information such as cost, finish, and management information is added to a three-dimensional digital model (hereinafter referred to as a 3D model) of buildings created on a computer.

The CIM is an abbreviation of Construction Information Modeling, which is a solution for the civil engineering field (general infrastructure such as roads, electric power, gas, and water) proposed in conformity with the BIM advanced in the building field. Similarly to the BIM, the CIM is a process to enhance the efficiency and sophistication of a series of construction production system by sharing information, particularly 3D model, among persons concerned.

What is important in promoting BIM and CIM is how to easily construct 3D models of buildings and public facilities.

In newly constructing a building, a to-be-completed building can be modeled from scratch using 3D computer aided design (CAD), which means that the BIM/CIM is comparatively easy to achieve. However, for exiting buildings, the original design drawing at the time when the building was built may not remain or may differ from the original design drawing because of modification, meaning that the BIM and CIM is difficult to achieve. The BIM of such exiting buildings is referred to as conversion of the existing building into the BIM is performed by As-Build BIM, which is a significant challenge for promoting the BIM and CIM in the future.

The As-Build BIM involves a workflow of measuring a space using a laser scanner (LS) and creating a CAD model from a measured point group. Classical As-Build BIM involves measuring a space with a picture and a measure and sketching and reproducing the space. This causes a significant operation cost, but has greatly improved the operating efficiency by using the LS.

The As-Build BIM using the LS has facilitated modeling data, but involves processing point groups, which was not included in workflow of the classical As-Build BIM.

The typical point-group processing involves measuring multiple points using the LS, positioning each point group, forming an integrated point group, removing from the integrated point group an unnecessary point such as noise, and finally converting the point group into a CAD model.

These processes are performed using commercially available point cloud processing software. Such commercially available point cloud processing software is difficult for an inexperienced person to handle because the point cloud processing software has multiple functions, and there are many parameters to be set for each function.

In addition, although there is a function of automatically performing each process, automation fails as the situation becomes more different from an ideal situation, for example, a point cannot be acquired because of, for example, occlusion. In this case, labor and man-hours are required, for example, the missing portion is manually complemented while comparing the point group with the photograph.

It is an object to appropriately generate three-dimensional shape information according to a user's level of skill and knowledge.

FIG. 1 is a diagram of an overview of a three-dimensional shape generation system 1 according to an embodiment of the present disclosure. The three-dimensional shape generation system 1 according to an embodiment of the present disclosure includes a terminal device 3 serving as a communication terminal and a management server 5 serving as a three-dimensional shape generation apparatus.

The management server 5, which serves as a three-dimensional shape generation apparatus, generates a three-dimensional shape information (information on a three-dimensional shape) indicating a three-dimensional shape for a three-dimensional point group using model shape information representing a three-dimensional model shape.

In the present disclosure, the three-dimensional point group refers to a set of coordinate points in a virtual three-dimensional space, which can be manipulated by computers. The three-dimensional point group may be referred to as a point cloud. The three-dimensional point group is a set of coordinate points corresponding to measurement points on a surface of an object when a space in which the object is present is measured using the LS or another tool. Color information may be added to each coordinate point, and red, green, and blue (RGB) values of each coordinate point may be added as the color information.

Although an example in which the three-dimensional point group is measured using the LS has been described, other optical measure or mechanical measure may be used. Examples of the optical measure include a method using a stereo camera and a method using visual simultaneous localization and mapping (SLAM).

The three-dimensional shape information represents a three-dimensional shape of an object that can be manipulated by a computer or other devices. The information indicating the three-dimensional shape enables geometrically identifying of the three-dimensional shape. For a sphere, for example, the coordinates of the center and the radius of the object correspond to information indicating the three-dimensional shape. When the three-dimensional shape of an object is represented by a polyhedron (polygon), the coordinate points of vertices of the polyhedron correspond to information indicating the three-dimensional shape. In another example, information representing the three-dimensional shape may be any information that uniquely defines the shape of the object.

The three-dimensional information may include information on color or material of the object, in addition to information indicating the three-dimensional shape of the object.

The three-dimensional model shape refers to a model such as a form and a template used for generating three-dimensional shape information from a three-dimensional point group. The model shape information refers to information indicating a three-dimensional model shape, in which one piece of model shape information corresponds to one three-dimensional model shape.

The terminal device 3 and the management server 5 are communicable with each other via a communication network 100. The communication network 100 is configured by the Internet, a mobile communication network, and a local area network (LAN). The communication network 100 may include networks based on wired communication and networks based on wireless communication such as 3rd generation (3G), worldwide interoperability for microwave access (WiMAX), and long term evolution (LTE). The terminal device 3 communicates by a short-range communication technology such as near field communication (NFC) (registered trademark).

Hardware Configuration

Figure 2:
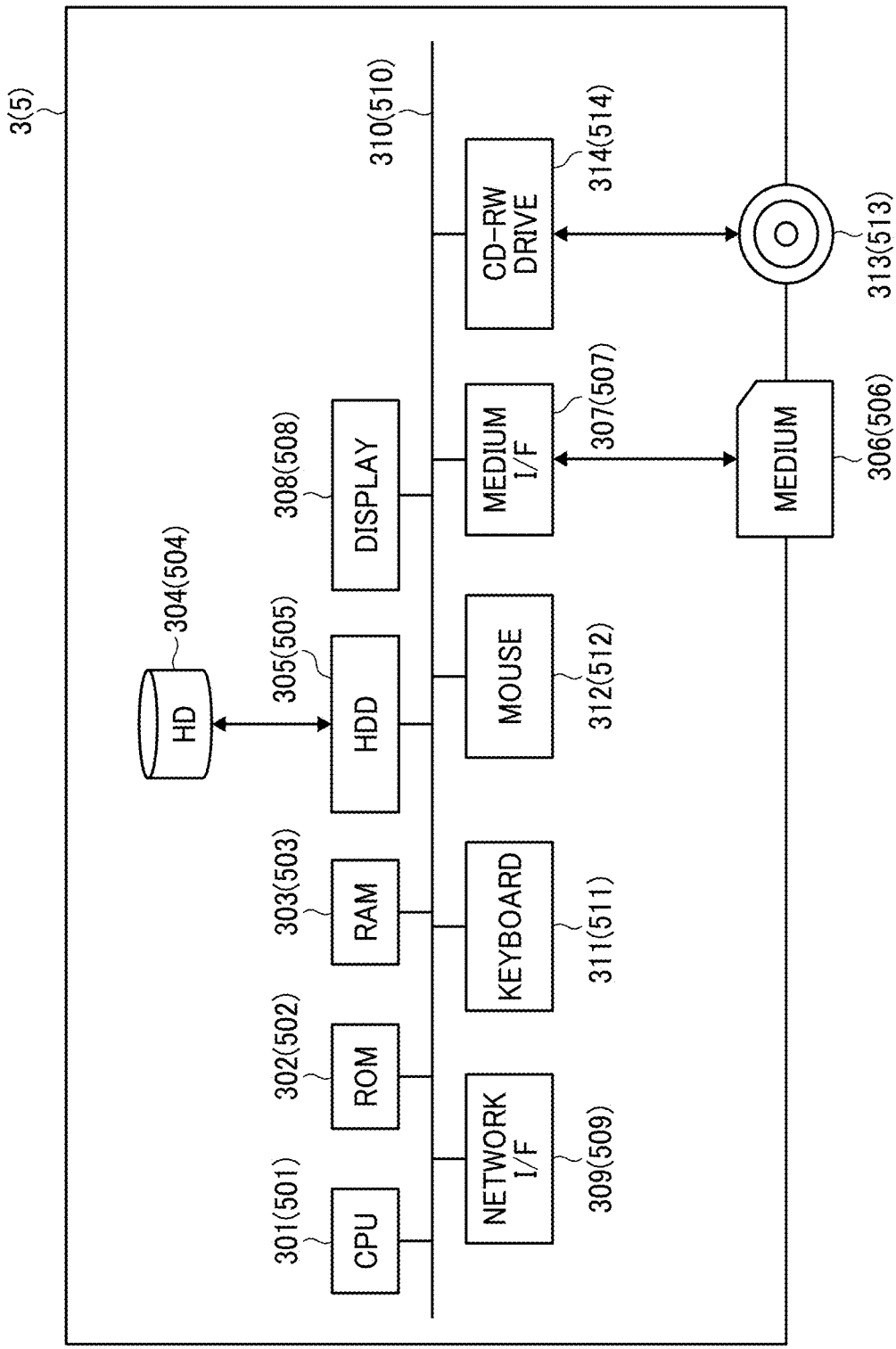
FIG. 2 is a hardware block diagram of a terminal device and a management server according to an embodiment of the present disclosure.

FIG. 2 is a hardware block diagram of a terminal device 3 and a management server 5 according to an embodiment of the present disclosure. In FIG. 2, the hardware components 301 to 314 are hardware elements of the terminal device 3. The hardware components 501 to 514 are hardware elements of the management server 5.

The terminal device 3 includes a central processing unit (CPU) 301, a read only memory (ROM) 302, a random access memory (RAM) 303, a hard disk (HD) 304, a hard disk drive (HDD) 305, a recording medium 306, a medium interface (I/F) 307, a display 308, a network interface (I/F) 309, a keyboard 311, a mouse 312, a compact disc-rewritable (CD-RW) drive 314, and a bus line 310.

The CPU 301 controls the entire operation of the terminal device 3. The ROM 302 stores a control program for operating the CPU 301. The RAM 303 is used as a work area for the CPU 301. The HD 304 stores various data such as programs. The HDD 305 controls reading or writing of various data to or from the HD 304 under control of the CPU 701. The medium I/F 307 controls reading or writing (storing) of data from or to a storage medium 306 such as a flash memory. The display 308 displays various information such as a cursor, a menu, a window, characters, or an image. The network I/F 309 is an interface that controls communication of data through the communication network 100. The keyboard 311 serves as an input device provided with multiple keys that allow a user to input characters, numerals, or various instructions. The mouse 312 serves as an input device that allows the user to select specific instructions, select a target object to be processed or executed, or move a curser being displayed. The CD-RW drive 314, which serves as a removable storage medium, controls reading and writing of various data from and to a CD-RW 513.

The management server 5 includes a CPU 501, a ROM 502, a RAM 503, a HD 504, a HDD 505, a recording medium 506, a medium I/F 507, a display 508, a network I/F 509, a keyboard 511, a mouse 512, a CD-RW drive 514, and a bus line 510. The CPU 501 serves as circuitry or a processor of the management server 5. Since these components have similar configurations to the above-described components (the CPU 301, ROM 302, RAM 303, HD 304, HDD 305, recording medium 306, medium I/F 307, display 308, network I/F 309, keyboard 311, mouse 312, CD-RW drive 314, and bus line 310), description thereof will be omitted.

Instead of the CD-RW drives 314 and 514, CD-R drives may be used. In one example, each of the terminal device 3 and the management system 5 is configured as a single computer. In another example, each of the terminal device 3 and the management system 5 is configured as multiple computers to which any one or more units (functions, means, or storages) are allocated. In other words, each of the terminal device 3 and the management system 5 can be implemented by multiple servers that operate in cooperation with one another.

Figure 3:
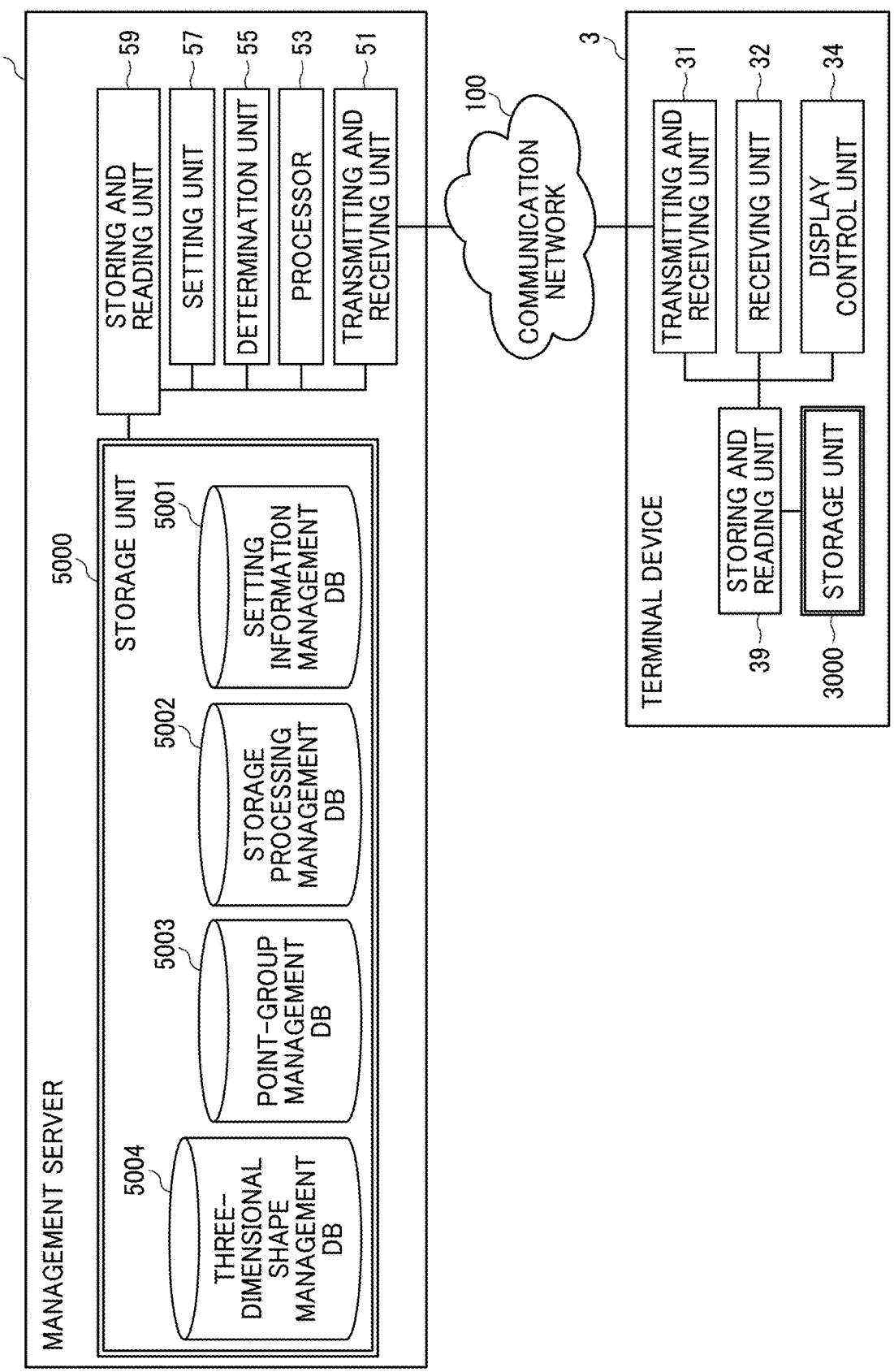
FIG. 3 is a functional block diagram of a three-dimensional shape generation system in FIG. 1.

FIG. 3 is a functional block diagram of a three-dimensional shape generation system 1 in FIG. 1.

As illustrated in FIG. 3, the terminal device 3 includes a transmitting and receiving unit 31, a receiving unit 32, a display control unit 34, and a storing and reading unit 39. These units are functions that are implemented by or that are caused to function by operating any of the hardware components illustrated in FIG. 2 in cooperation with the instructions of the CPU 301 according to the control program expanded from the HD 304 to the RAM 303. The terminal device 3 further includes a storage unit 3000 implemented by the RAM 303 and HD 304 in FIG. 2.

Functional Configuration of Terminal Device

The components of the terminal device 3 are described below.

The transmitting and receiving unit 31 serving as a transmitter, which is implemented by instructions of the CPU 301 and by the network I/F 309 in FIG. 2, transmits or receives various types of data (or information) to or from other terminal, device, apparatus, or system through the communication network 100.

The receiving unit 32 serves as a receiver, which is implemented by instructions of the CPU 301 FIG. 2 and by the keyboard 311 and the mouse 312. The receiving unit 32 receives various inputs from the user.

The display control unit 34 serves as a display controller, which is implemented by a command from the CPU 301 in FIG. 2. The display control unit 34 causes the display 308 serving as a display unit to display various images or a screen.

The storing and reading unit 39 serves as a storage controller, which is implemented by instructions from the CPU 301 in FIG. 2 and by the HDD 305, the medium I/F 307, and the CD-RW drive 314. The storing and reading unit 39 stores various data in the storage unit 3000, the recording medium 306, and the CD-RW 313, and reads the various data from the storage unit 3000, the recording medium 306, and the CD-RW 313.

Functional Configuration of Management Server

The management server 5 includes a transmitting and receiving unit 51, a processor 53, a determination unit 55, a setting unit 57, and a storing and reading unit 59. These units are functions or means implemented by or caused to function by operating one or more hardware components illustrated in FIG. 2 in cooperation with instructions of the CPU 501 according to the program loaded from the HD 504 to the RAM 503. The management sever 5 includes a storage unit 5000 configured by the HD 504 in FIG. 2. The storage unit 5000 serves as a storage unit.

Functional Configuration of Management Server

The components of the management server 5 are described below. The management server 5 may is configured as multiple computers to which any one or more units (functions, means, or storages) are allocated. The description is given of an example in which the management server 5 is a server computer that resides in a cloud environment. In another example, the management server 5 is a server that resides in an on-premises environment.

The transmitting and receiving unit 51 serving as a transmitter, which is implemented by instructions of the CPU 501 and by the network IF 509 in FIG. 2, transmits or receives various types of data (or information) to or from other terminal, device, apparatus, or system through the communication network 100.

The processor 53, which is implemented by instructions of the CPU 501 in FIG. 2, serves to perform various processes to be described below. The processor 53 serves as a three-dimensional information generation unit that generates three-dimensional shape information.

The determination unit 55, which is implemented by instructions of the CPU 501 in FIG. 2, serves to perform various determinations to be described below.

The processor 57, which is implemented by instructions of the CPU 501 in FIG. 2, serves to perform various settings and determinations to be described below.

The storing and reading unit 59 serves as a storage controller, which is implemented by instructions from the CPU 501 in FIG. 2 and by the HDD 505, the medium I/F 507, and the CD-RW drive 514. The storing and reading unit 59 stores various data in the storage unit 5000, the recording medium 506, and the CD-RW 513, and reads the various data from the storage unit 5000, the recording medium 506, and the CD-RW 513. The storage unit 5000, the recording medium 506, and the CD-RW 513 serve as a storage unit.

The storage unit 5000 stores a setting information management database (DB) 5001, which is implemented by a setting information management table, a storage processing management DB 5002, a point-group management DB 5003, and a three-dimensional shape management DB 5004.

The setting information management DB 5001 stores and manages various types of information. The storage processing management DB 5002 stores and manages various processing programs for generating a three-dimensional shape. The point-group management DB 5003 stores and manages three-dimensional point group information for generating a three-dimensional shape. The three-dimensional shape management DB 5004 stores and manages three-dimensional shape information.

In the present disclosure, various processing programs stored and managed in the storage processing management DB 5002 includes stored processing for performing a partial generation processing (i.e., some generation processes) for generating three-dimensional shape information.

FIG. 4 is a conceptual diagram of a setting information management table according to an embodiment of the present disclosure.

The setting information management table is a table for managing the three-dimensional point group data used to generate a three-dimensional shape and the execution order and the processing mode of a part of the generation processing for generating the three-dimensional shape. The storage unit 5000 stores the setting information management DB 5001, such as the setting information management table as illustrated in FIG. 4. In the setting information management table, the file name of the three-dimensional point group data, the execution order and the processing mode of the partial generation processing for generating the three-dimensional shape are in association with each other for each user ID.

The partial generation processing for generating the three-dimensional shape (i.e., some processes involved in the generation processing for generating the three-dimensional shape) include a registration process, a noise removal process, a segmentation process, and a modeling process.

The registration processing (i.e., a point-cloud registration) is a process of transforming multiple three-dimensional point groups into one integrated three-dimensional point group. The noise removal processing is a process of removing an unnecessary point group from the three-dimensional point groups.

The segmentation process is a process of labeling a particular point group in the three-dimensional point groups to distinguish the particular point group from the other point groups. In one example, the segmentation processing involves labeling multiple particular point groups differently from each other to allow the multiple particular point groups to be identified from one another. In another example, the segmentation process may be performed together with a clustering process of grouping point groups which are close to each other among the labeled point groups.

The modeling process is a process of collating a particular point group within the three-dimensional point groups with a model shape, and replacing the particular point group with the model shape, which is determined to be closest to the shape of the particular point group.

The "processing mode" includes manual processing, automatic processing, and mixed processing that is a combination of the manual processing and the automatic processing. The manual processing involves executing the entire or partial generation processing for generating the three-dimensional shape information based on an operation input by a user and without being based on a stored processing that is stored in a data base such as the storage processing management DB. The automatic processing involves executing the entire or partial generation processing for generating the three-dimensional shape information based on pre-stored processing and without being based on an operation input that is input by the user to the terminal device 3. The mixed processing, which is a combination of the automatic processing and the manual processing, involves executing the entire or partial generation processing for generating the three-dimensional shape information based on both an operation input and storage processing.

The manual processing and the mixed processing are referred to as a first processing for executing the entire or partial generation processing for generating the three-dimensional shape information based on the operation input from a user. The automatic processing is referred to as a second processing for executing the entire or partial generation processing for generating the three-dimensional shape information based on pre-stored processing and without being based on the operation input.

In a configuration in which the management server 5 is configured as multiple computers to which any one or more units (functions, means, or storages) are allocated, a first computer executes all or a part of the generation processing for generating the three-dimensional shape information based on an operation input without being based on stored processing. Further, a second computer executes all or a part of the generation processing for generating the three-dimensional shape information based on a pre-stored processing without being based on the operation input from the user.

Figure 5:
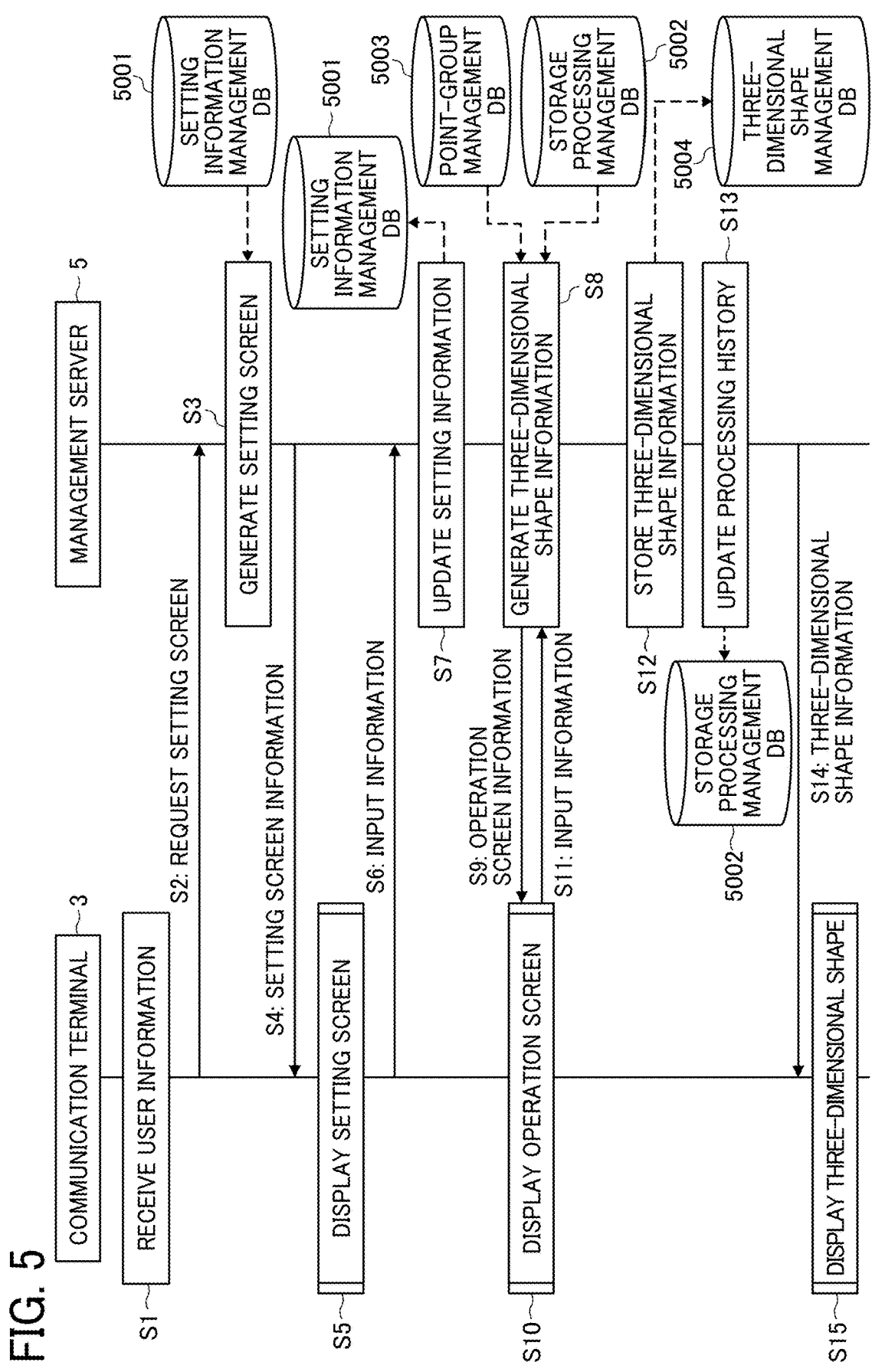
FIG. 5 is a sequence diagram of a three-dimensional shape generation process according to an embodiment of the present disclosure.

FIG. 5 is a sequence diagram of a three-dimensional shape generation process according to an embodiment of the present disclosure.

The receiving unit 32 of the terminal device 3 serving as a communication terminal receives an operation relating to user information of the user, which is input to the input/output screen displayed on the display 308 (step S1). The transmitting and receiving unit 31 of the communication terminal (the terminal device 3) transmits a request for a setting screen including the user information received in step S1 to the management sever 5. The transmitting and receiving unit 51 of the management server 5 receives the request transmitted from the communication terminal (step S2).

The storing and reading unit 59 of the management server 5 searches the setting information management DB 5001 using a search key that is the user information included in the request received in step S2, and reads a file name of a three-dimensional point group data relating to the user information included in the request and an execution order and a processing mode of the generation processing for generating a three-dimensional shape. The setting unit 57 of the management server 5 generates a setting screen based on the file name, execution order, and processing mode read out by the storing and reading unit 59 (step S3).

The setting screen includes a point-group setting screen, a processing setting screen, and an instruction reception screen. The point-group setting screen receives a point-group setting operation for setting a three-dimensional point group used to generate the three-dimensional shape information. The processing setting screen receives a processing setting operation for setting an execution order and processing mode for some processes of the generation processing for generating the three-dimensional shape information. The instruction reception screen receives an instruction operation that instructs the first processing or the second processing.

The transmitting and receiving unit 51 transmits setting screen information relating to the setting screen generated in step S3 to the communication terminal (the terminal device 3). The transmitting and receiving unit 31 of the communication terminal (the terminal device 3) receives the setting screen information transmitted from the management server 5 (step S4). Step S4 is a transmitting step of transmitting instruction reception screen information relating to the model information setting screen. The transmitting and receiving unit 51 serves as a transmitter.

The display control unit 34 of the communication terminal (terminal device 3) causes the display 308 to display the setting screen received in step S4 (step S5). The receiving unit 32 of the communication terminal (the terminal device 3) receives a predetermined input operation for the displayed setting screen, from the user. The predetermined input operation is set by the user in advance. The input operation (i.e., an operation input from a user) includes the point-group setting operation, the processing setting operation, and the instruction operation for designating the first processing or the second processing. Step S5 is a step of receiving an instruction operation for designating the first processing or the second processing.

The transmitting and receiving unit 31 transmits input information relating to the input operation received by the receiving unit 32 to the management server 5. The transmitting and receiving unit 51 of the management server 5 receives the input information transmitted from the communication terminal (the terminal device 3) (step S6). The input information includes point-group setting information indicating a three-dimensional point group set by the point-group setting operation and processing setting information indicating the execution order and processing mode of the generation processing set by the processing setting operation.

The storing and reading unit 59 of the management server 5 updates the execution order and processing mode of the generation processing, which are stored in association with the user information in the setting information management DB 5001, based on the processing setting information included in input information received in step S6 (step S7).

The storing and reading unit 59 searches the point-group management DB 5003 using the point-group setting information included in the input information received in step S6 as a search key, so as to read three-dimensional point group data associated with the point-group setting information. The storing and reading unit 59 searches the storage processing management DB 5002 using the processing mode of the generation processing in the processing setting information included in the input information received in step S6, as a search key, so as to read processing program associated with the processing setting information. The processor 53 of the management server 5 generates the three-dimensional shape information based on the three-dimensional point-group data and processing program read by the storing and reading unit 59 and the execution order and processing mode of the generation processing in the processing setting information included in the input information received in step S6 (step S8).

Step S8 is a step of generating three-dimensional information used in the first processing or the second processing, based on the point-group information indicating three-dimensional point groups and the instruction operation received by the instruction reception screen that receives an instruction operation for designating the first processing or the second processing.

When the processing mode includes the manual processing and the mixed processing, the setting unit 57 of the management server 5 generates the operation screen that receives an operation input for generating three-dimensional shape information. The transmitting and receiving unit 51 transmits operation screen information relating to the operation screen to the communication terminal (the terminal device 3) (step S9).

The transmitting and receiving unit 31 of the communication terminal (the terminal device 3) receives the operation screen information transmitted from the management sever 5. The display control unit 34 of the communication terminal causes the display 308 to display the operation screen received from the management server 5. The receiving unit 32 of the communication terminal receives a predetermined input operation input from the user to the displayed operation screen (step S10).

The input operation includes inputting an operation for performing the entire or partial generation processing for generating three-dimensional shape information.

The transmitting and receiving unit 31 transmits input information relating to the input operation received by the receiving unit 32 to the management server 5. The transmitting and receiving unit 51 of the management server 5 receives the input information transmitted from the communication terminal (the terminal device 3) (step S11).

The input information includes operation input information from the user inputting an operation for performing the entire or partial generation processing for generating three-dimensional shape information. The processor 53 of the management server 5 generates the three-dimensional shape information based on the operation input information included in the input information received in step S11. The operation input information is an example of history information when the three-dimensional information generation unit performs the first processing.

The communication terminal (the terminal device 3) and the management sever 5 repeatedly execute steps S8 to S11 as appropriate.

The processor 53 converts the generated three-dimensional shape information into CAD format. The storing and reading unit 59 stores the converted three-dimensional shape information in the three-dimensional shape management DB 5004, the recording medium 506, or the CD-RW 513 (step S12). The CAD format is three-dimensional shape information that can be manipulated by the 3D CAD. The three-dimensional shape information is converted into 3D CAD format when manipulated with a commercially available 3D CAD.

The storing and reading unit 59 updates the processing program stored in the storage processing management DB 5002 based on the operation input for executing the entire or partial generation processing for generating the three-dimensional shape information in step S10 (step S13).

The storing and reading unit 59 serves as an updating unit that updates the stored processing based on the history information when the three-dimensional information generation unit performs the first processing.

The transmitting and receiving unit 51 transmits the determined three-dimensional shape information to the communication terminal (the terminal device 3) (step S14). The transmitting and receiving unit 31 of the communication terminal (the terminal device 3) receives the three-dimensional shape information transmitted from the management server 5, and the display control unit 34 of the communication terminal causes the display 308 to display the received three-dimensional shape (step S15).

Figure 6:
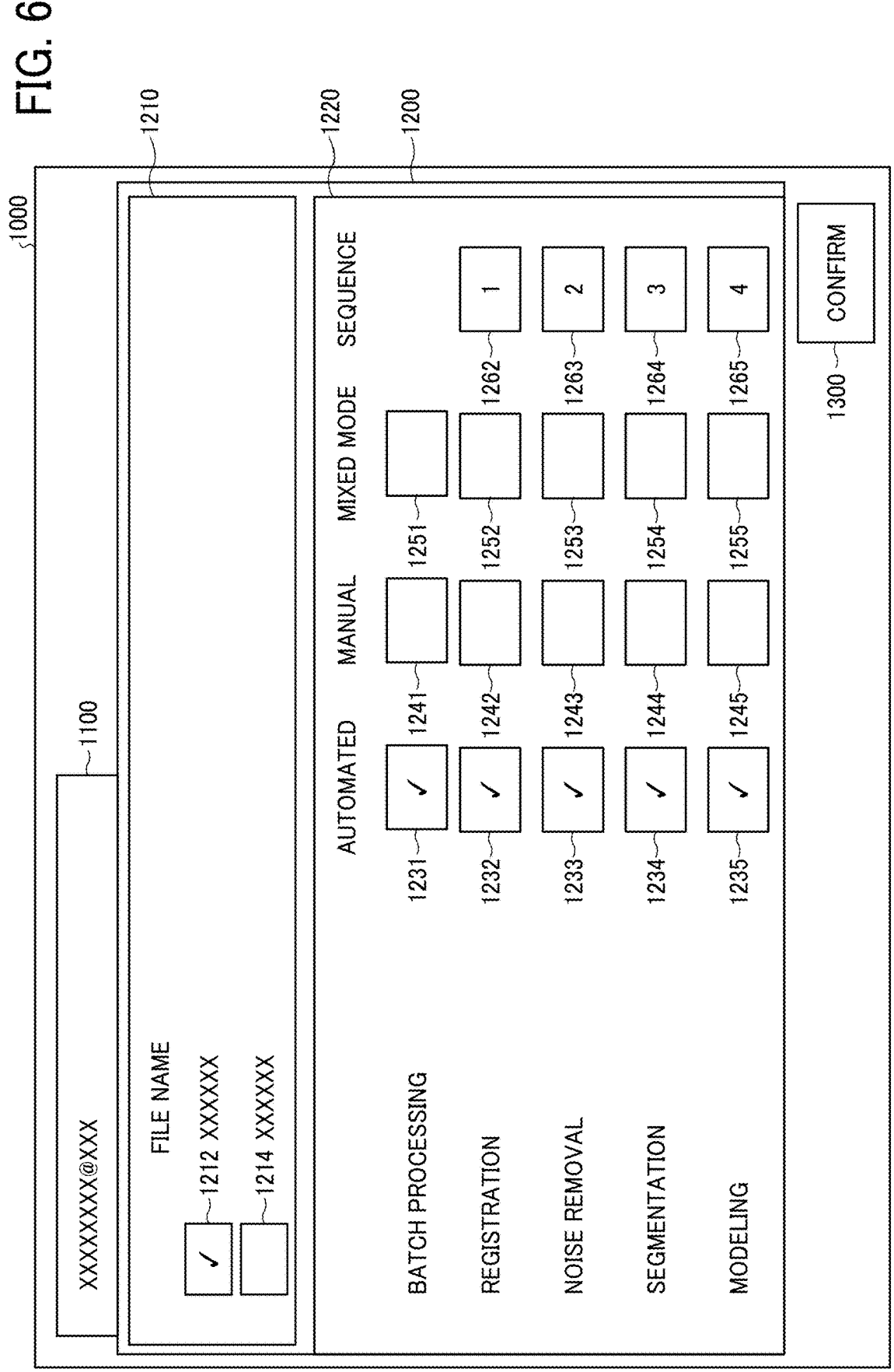
FIG. 6 is an illustration of a display screen according to an embodiment of the present disclosure.

FIG. 6 is an illustration of a display screen according to an embodiment of the present disclosure. FIG. 6 illustrates a display screen 1000 displayed on the display 308 of the terminal device 3 in step S5 of the sequence diagram in FIG. 5.

The display control unit 34 of the communication terminal causes the display 308 to display a user information display screen 1100, a setting screen 1200, and a confirmation key 1300 serving as an instruction reception screen on the display screen 1000.

The setting screen 1200 includes a point-group setting screen 1210 and a processing setting screen 1220.

The point-group setting screen 1210 is a screen that receives a point-group setting operation for setting point-group information indicating a three-dimensional point group used to generate three-dimensional shape information. The display control unit 34 causes the display 308 to display point-group setting boxes 1212 and 1214 on the point-group setting screen 1210, which are associated with the file names of multiple sets of point group data read by the storage and reading unit 59. For the point-group setting box, multiple point-group setting boxes (i.e., additional point-group setting boxes in addition to the point-group setting boxes 1212 and 1214) may be set.

The processing setting screen 1220 is a screen that receives a processing setting operation for setting the execution order and processing mode of some processes of the generation processing for generating the three-dimensional shape information.

The processing setting screen 1220 includes an automatic processing collective setting box 1231, an automatic registration processing setting box 1232, an automatic noise removal processing setting box 1233, an automatic segmentation processing setting box 1234, and an automatic modeling processing setting box 1235, which are intended for the automatic generation processing for generating three-dimensional shape information based on the stored processing but without being based on the operation input from the user.

The processing setting screen 1220 also includes a manual processing collective setting box 1241, a manual registration processing setting box 1242, a manual noise removal processing setting box 1243, a manual segmentation processing setting box 1244, and a manual modeling processing setting box 1245, which are intended for manual generation processing for generating three-dimensional shape information based on the input operation but without being based on the stored processing.

The processing setting screen 1220 further includes a mixed processing collective setting box 1251, a mixed registration processing setting box 1252, a mixed noise removal processing setting box 1253, a mixed segmentation processing setting box 1254, and a mixed modeling processing setting box 1255, which are intended for the mixed generation processing for generating three-dimensional shape information based on both the input operation and the stored processing.

The processing setting screen 1220 also includes a registration processing ordinal number setting box 1262, a noise removal processing ordinal number setting box 1263, a segmentation processing ordinal number setting box 1264, and a modeling processing ordinal number setting box 1265 (or referred to as ordinal-number setting boxes 1262, 1263, 1264, and 1265), which are used to set the execution order of multiple generation processes.

The automatic processing collective setting box 1231 is a reception screen that receives a setting operation for collectively setting the automatic registration processing setting box 1232 to the automatic modeling processing setting box 1235.

The automatic registration processing setting box 1232 is a reception screen that receives a setting operation for setting the automatic registration processing in which the registration processing is automatically performed.

The automatic noise removal processing setting box 1233 is a reception screen that receives a setting operation for setting the automatic noise removal processing in which the noise removal processing is automatically performed.

The automatic segmentation processing setting box 1234 is a reception screen that receives a setting operation for setting the automatic segmentation processing in which the segmentation processing is automatically performed.

The automatic modeling processing setting box 1235 is a reception screen that receives a setting operation for setting the automatic modeling processing in which the modeling processing is automatically performed.

The manual processing collective setting box 1241 is a reception screen that receives a setting operation for collectively setting the manual registration processing setting box 1242 to the manual modeling processing setting box 1245.

The manual registration processing setting box 1242 is a reception screen that receives a setting operation for setting the manual registration processing in which the registration processing is manually performed.

The manual noise removal processing setting box 1243 is a reception screen that receives a setting operation for setting the manual noise removal processing in which the noise removal processing is manually performed.

The manual segmentation processing setting box 1244 is a reception screen that receives a setting operation for setting the manual segmentation processing in which the segmentation processing is manually performed.

The manual modeling processing setting box 1245 is a reception screen that receives a setting operation for setting the manual modeling processing in which the modeling processing is manually performed.

The mixed processing collective setting box 1251 is a reception screen that receives a setting operation for collectively setting the mixed registration processing setting box 1252 to the mixed modeling processing setting box 1255.

The mixed registration processing setting box 1252 is a reception screen that receives a setting operation for setting the mixed registration processing in which the registration processing is performed in a mixed mode (i.e., automatically and manually).

The mixed noise removal processing setting box 1253 is a reception screen that receives a setting operation for setting the mixed noise removal processing in which the noise removal processing is performed in a mixed mode (i.e., automatically and manually).

The mixed segmentation processing setting box 1254 is a reception screen that receives a setting operation for setting the mixed segmentation processing in which the segmentation processing is performed in a mixed mode (i.e., both automatically and manually).

The mixed modeling processing setting box 1255 is a reception screen that receives a setting operation for setting the mixed modeling processing in which the modeling processing is performed in a mixed mode (i.e., automatically and manually).

In the present disclosure, the automatic processing collective setting box 1231, the manual processing collective setting box 1241, and the mixed processing collective setting box 1251 each include at least the registration processing, the noise removal processing, the segmentation processing, and the modeling processing.

The registration processing ordinal number setting box 1262 is a reception screen that receives a setting operation for setting an ordinal number of the registration processing in the execution order of the generation processes.

The noise removal processing ordinal number setting box 1263 is a reception screen that receives a setting operation for setting an ordinal number of the noise removal processing in the execution order of the generation processes.

The segmentation processing ordinal number setting box 1264 is a reception screen that receives a setting operation for setting an ordinal number of the segmentation processing in the execution order of the generation processes.

The modeling processing ordinal number setting box 1265 is a reception screen that receives a setting operation for setting an ordinal number of the modeling processing in the execution order of the generation processes.

In response to receiving a selection input from the user by the receiving unit 32 of the communication terminal (the terminal device 3) (i.e., the user's pointing at any of different setting boxes with a pointing device such as the mouse 312), the display control unit 34 causes the display 308 to display a check mark on the selected box of the different setting boxes. Further, in response to receiving various setting operations and an operation on the confirmation key 1300 by the receiving unit 32, the various setting operations are confirmed.

As described in step S6 of FIG. 5, the transmitting and receiving unit 31 transmits, to the management server 5, input information including various setting information received by the receiving unit 32.

In another example, the processing setting screen 1220 may be configured to receive a setting operation for setting multiple executions of each of the registration processing, the noise removal processing, the segmentation processing, and the modeling processing.

When a setting operation is not performed on any of the automatic processing collective setting box 1231, the manual processing collective setting box 1241, the mixed processing collective setting box 1251, the mixed registration processing setting box 1252, the automatic registration processing setting box 1232, and the manual registration processing box 1242, the registration processing is not performed. The same applies to the noise removal processing, segmentation processing, and modeling processing.

FIG. 7 is a flowchart of a process of generating a three-dimensional shape according to an embodiment of the present disclosure, which is the process in step S8 of FIG. 5.

The processor 53 of the management server 5 acquires the three-dimensional point group data read by the storing and reading unit 59 (step S21). The setting unit 57 sets an ordinal number N of any of various generation processes to 1 (step S22).

The setting unit 57 determines the Nth process of the generation processing based on the execution order of the generation processing included in the processing setting information received in step S6 (step S23).

Based on the processing mode of the generation processing included in the processing setting information received in step S6, the determination unit 55 determines whether the processing mode of the Nth process determined in step S23 is the manual processing or not (step S24).

When the determination unit 55 determines that the Nth process is the manual processing (YES in step S24), the setting unit 57 of the management server 5 generates an operation screen that receives an input operation for generating three-dimensional shape information. The transmitting and receiving unit 51 transmits operation screen information relating to the operation screen to the communication terminal (the terminal device 3) (step S25).

The processor 53 executes the Nth generation process based on the operation input information received in step S11 (step S26).

The determination unit 55 determines whether the Nth generation process has ended or not (step S27). When the determination unit 55 determines that the Nth generation process has not ended (NO in step S27), the process returns to step S26.

When determining that the Nth generation process ends, the determination unit 55 further determines whether the Nth generation process is the last generation process or not (step S28). When the determination unit 55 determines that the Nth generation process is the last generation process, the setting unit 57 adds "1" to the ordinal number N in which any of the generation processing is performed (step S29). Then, the process returns to step S23.

When determining the processing mode is not the manual processing in step S24 (NO in step S24), the determination unit 55 further determines whether the processing mode of the Nth generation process determined in step S23 is the automatic processing (step S30).

When the determination unit 55 determines that the processing mode is not the automatic processing (NO in step S30), the setting unit 57 of the management server 5 generates an operation screen that receives an operation input for generating three-dimensional shape information. The transmitting and receiving unit 51 transmits operation screen information relating to the operation screen to the communication terminal (the terminal device 3) (step S31). In another example, instead of step S30, the determination unit 55 determines whether the processing mode of the Nth generation processing determined in step S23 is the mixed processing or not. When the determination unit 55 determines that the processing mode is the mixed processing, the process proceeds to step S31.

The processor 53 of the management server 5 executes the Nth generation process based on the operation input information received in step S11 and the processing program read from the storage processing management DB 5002, the processing program being stored in association with the process setting information (step S32).

The determination unit 55 determines whether the Nth generation process has ended or not (step S33). When the determination unit 55 determines that the Nth generation process has not ended (NO in step S33), the process returns to step S32. When the determination unit 55 determines that the Nth generation process has ended (YES in step S33), the process proceeds to step S28.

When the determination unit 55 determines that the processing mode is the automatic processing in step S30 (YES in step S30), the processor 53 executes the Nth generation process based on the processing program read from the storage processing management DB 5002, the processing program being stored in association with the processing setting information (step S34).

The determination unit 55 determines whether the Nth generation process has ended or not (step S35). When the determination unit 55 determines that the Nth generation process has not ended (NO in step S35), the process returns to step S34. When the determination unit 55 determines that the Nth generation process has ended (YES in step S35), the process proceeds to step S28.

Figure 8:
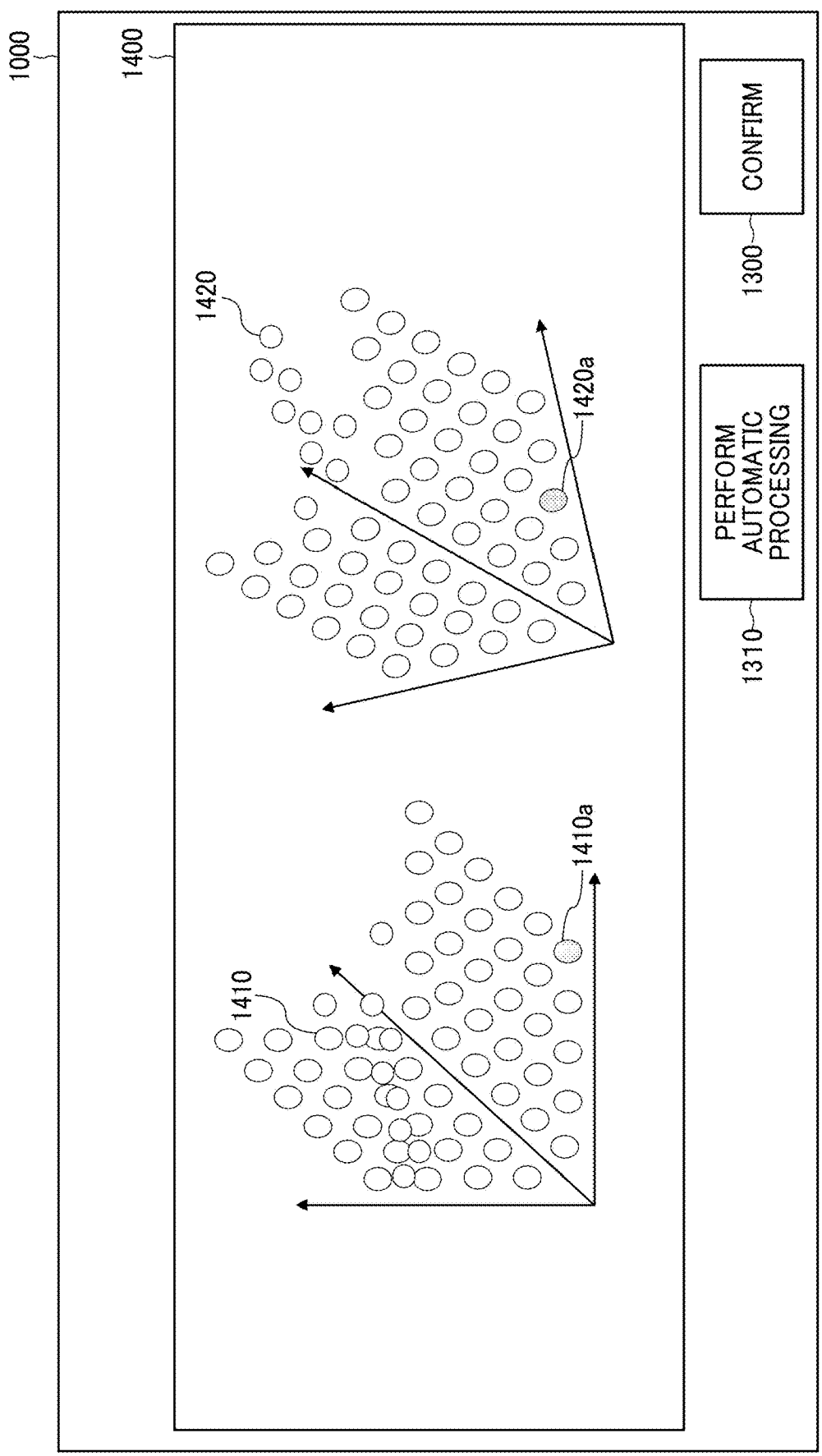
FIG. 8 is an illustration of a registration process according to an embodiment of the present disclosure.

FIG. 8 is an illustration of the registration process according to an embodiment of the present disclosure.

FIGS. 8 to 11 each illustrate a display screen 1000, which is displayed on the display 308 of the terminal device 3 in step S10 of the sequence diagram in FIG. 5 when the processing mode is the mixed processing.

In FIGS. 8 to 11, the display control unit 34 of the communication terminal (the terminal device 3) causes the display 308 to display display an operation screen 1400, an automatic processing execution key 1310, and a confirmation key 1300 on the display screen 1000. The automatic processing execution button 1310 is a setting screen that receives a setting operation for causing the management server 5 to execute a part of the generation processing according to the processing program process. When the processing mode is the manual processing, the automatic processing execution key 1310 is not displayed.

In FIG. 8, the display control unit 34 of the communication terminal (the terminal device 3) causes the display 308 to display first three-dimensional point groups 1410 and second three-dimensional point groups 1420 as two dimensional or three dimensional images on the operation screen 1400. On such a screen, the user operates a pointing device such as a mouse 312 to perform the registration processing in various manners as described below.

Manual Processing Only

On the operation screen of the communication terminal, the user moves the first three-dimensional point groups 1410 and the second three-dimensional point groups 1420 relative to each other by translation or rotation to overlap the first three-dimensional point groups 1410 and the second three-dimensional point groups 1420; aligns a feature point 1410a included in the first three-dimensional point groups 1410 and a feature point 1420a included in the second three-dimensional point groups 1420 with each other; and operates the confirmation key 1300. In response to such operations input by the user, the receiving unit 32 of the communication terminal receives a predetermined input operation, which has been input from the user to the operation screen displayed on the display 308.

Then, processor 53 of the management server 5 transforms the first three-dimensional point groups 1410 and the second three-dimensional point groups 1420 into one integrated three-dimensional point group based on the operation input information included in the input information received in step S11, and ends the registration processing.

A skilled user selects a position to be a feature point and aligns the floors and the walls with reference to density, object, and surface.

Alternatively, when each of the first three-dimensional point groups 1410 and the second three-dimensional point groups 1420 is acquired, a marker is arranged at a position that can be a feature point for each of the first three-dimensional point groups 1410 and the second three-dimensional point groups 1420. The markers of the first three-dimensional point groups 1410 and the second three-dimensional point groups 1420 are aligned to overlap with each other.

Further, alignment is performed by viewing from various directions using a 3D mouse or the like.

Manual Processing after Automatic Processing

In response to an operation on the automatic processing execution key 1310 by the user before inputting an operation to the operation screen 1400, the receiving unit 32 receives setting information input to the automatic processing execution key 1310.

Then, based on the setting information included in the input information received in step S11, the processor 53 of the management server 5 aligns the first three-dimensional point group 1410 with the second three-dimensional point groups 1420 using the processing program related to the registration processing read from the storage processing management DB 5002.

Subsequently, as in step S9, the setting unit 57 of the management server 5 generates an operation screen including the first three-dimensional point groups 1410 and the second three-dimensional point groups 1420 aligned together by the processing program. The transmitting and receiving unit 51 transmits operation screen information relating to the operation screen to the communication terminal (the terminal device 3).

In response to the user's fine adjustment of the relative position between the first three-dimensional point groups 1410 and the second three-dimensional point groups 1420 aligned together by the processing program and an operation on the confirmation key 1300, the processor 53 of the management server 5 transforms the first three-dimensional point groups 1410 and the second three-dimensional point groups 1420 having their relative position finely adjusted by the user into one integrated three-dimensional point group and ends the registration processing.

Automatic Processing after Manual Processing

On the operation screen of the communication terminal, the user moves the first three-dimensional point groups 1410 and the second three-dimensional point groups 1420 relative to each other by translation or rotation to overlap the first three-dimensional point groups 1410 and the second three-dimensional point groups 1420; aligns a feature point 1410a included in the first three-dimensional point groups 1410 and a feature point 1420a included in the second three-dimensional point groups 1420 with each other; and operates the automatic processing execution key 1310. In response to such operations input by the user, the receiving unit 32 of the communication terminal receives a predetermined input operation, which has been input from the user to the operation screen displayed on the display 308, and the setting information for the automatic processing execution key 1310.

Then, based on the operation input information and the setting information included in the input information received in step S11, the processor 53 of the management server 5 finely adjusts the relative position between the first three-dimensional point group 1410 and the second three-dimensional point groups 1420, which are aligned by the user, using the processing program related to the registration processing read from the storage processing management DB 5002.

Subsequently, as in step S9, the setting unit 57 of the management server 5 generates an operation screen including the first three-dimensional point groups 1410 and the second three-dimensional point groups 1420, between which the relative position is finely adjusted by the processing program. The transmitting and receiving unit 51 transmits operation screen information relating to the operation screen to the communication terminal (the terminal device 3).

In response to the user's operation on the confirmation key 1300 after checking the first three-dimensional point groups 1410 and the second three-dimensional point groups 1420, between which the relative position is finely adjusted by the processing program, the processor 53 of the management server 5 transforms the first three-dimensional point groups 1410 and the second three-dimensional point groups 1420, between which the relative position is finely adjusted by the processing program, into one integrated three-dimensional point group and ends the registration processing.

Figure 9:
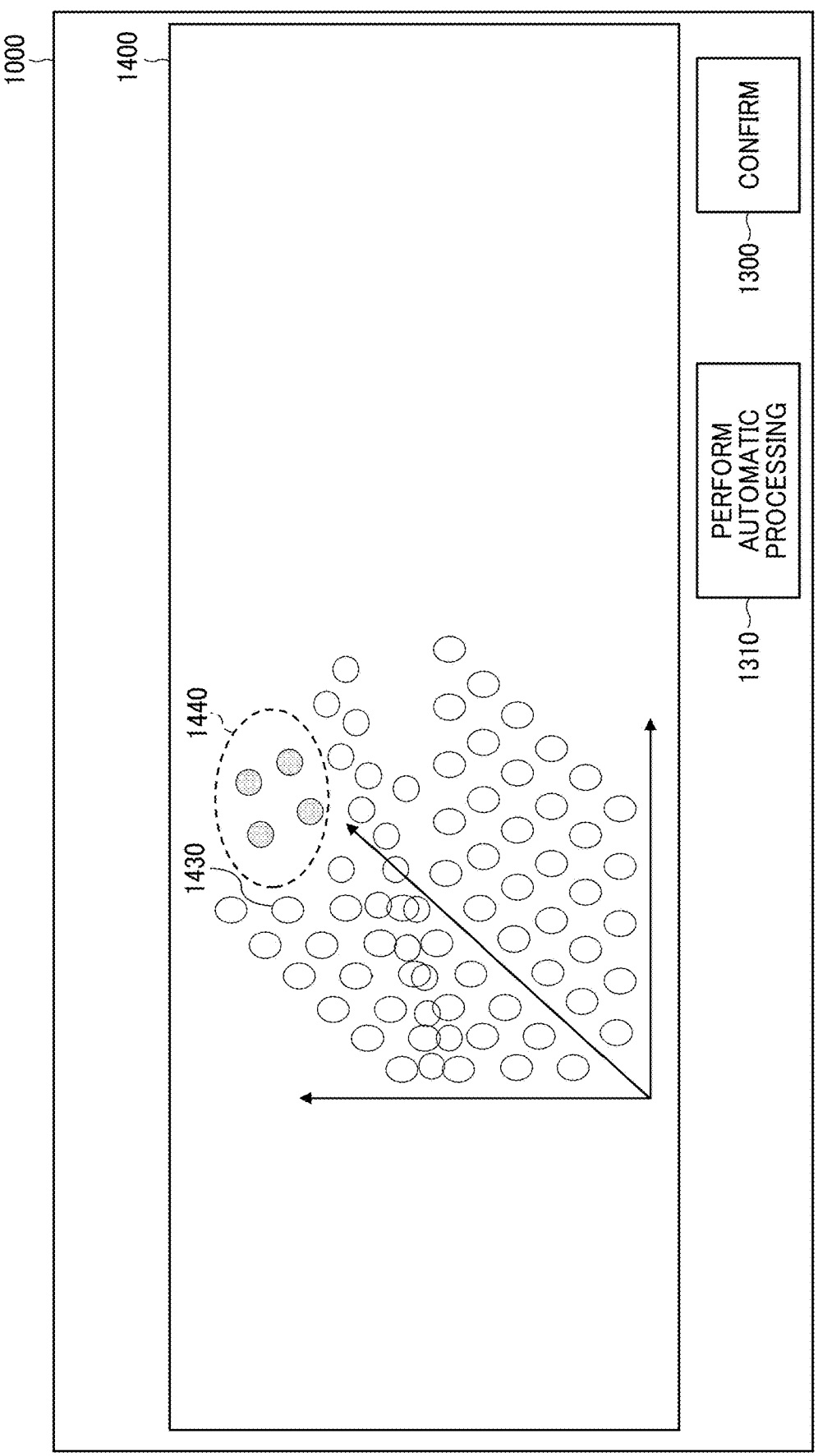
FIG. 9 is an illustration of a noise removal process according to an embodiment of the present disclosure.

FIG. 9 is an illustration of a noise removal process according to an embodiment of the present disclosure.

In FIG. 9, the display control unit 34 of the communication terminal (the terminal device 3) causes the display 308 to display three-dimensional point groups 1430 as two-dimensional or three-dimensional images on the operation screen 1400. On such a screen, the user operates a pointing device such as the mouse 312 to perform the noise removal processing in various manners as described below.

Manual Processing Only

In the noise removal processing, the user selects unnecessary point groups 1440 from among the three-dimensional point groups 1430 and operates the confirmation key 1300. In response to such operations input from the user, the receiving unit 32 of the communication terminal receives a predetermined input operation, which is input from the user to the operation screen displayed on the display 308.

Then, processor 53 of the management server 5 removes unnecessary point groups 1440 from the three-dimensional point groups 1430 based on the operation input information included in the input information received in step S11, and ends the noise removal processing.

Manual Processing after Automatic Processing

In response to an operation on the automatic processing execution key 1310 by the user before inputting an operation to the operation screen 1400, the receiving unit 32 receives setting information input to the automatic processing execution key 1310.

Then, based on the setting information included in the input information received in step S1, the processor 53 of the management server 5 selects unnecessary point groups 1440 from the three-dimensional point groups 1430 using the processing program related to the noise removal processing read from the storage processing management DB 5002.

Subsequently, as in step S9, the setting unit 57 of the management server 5 generates an operation screen including the three-dimensional point groups 1430 and the unnecessary point groups 1440 selected using the processing program. The transmitting and receiving unit 51 transmits operation screen information relating to the operation screen to the communication terminal (the terminal device 3).

The user finely adjusts the area of the unnecessary point groups 1440 selected according to the processing program and operates the confirmation key 1300. In response to such operations from the user, the processor 53 of the management server 5 removes the unnecessary point groups 1440, whose area is finely adjusted by the user, from the three-dimensional point groups 1430, and ends the noise removal processing. Specifically, the user expands or reduces the area of the unnecessary point groups 1440 selected by the processor 53, adds or removes a particular point to or from the area of the unnecessary point groups 1440 selected by the processor 53.

Automatic Processing after Manual Processing

In the noise removal processing, the user selects unnecessary point groups 1440 from among the three-dimensional point groups 1430 and operates the automatic processing execution key 1310. In response to such operations input from the user, the receiving unit 32 of the communication terminal receives a predetermined input operation, which is input from the user to the operation screen displayed on the display 308, and the setting information for the automatic processing execution key 1310.

Then, based on the operation input information and the setting information included in the input information received in step S11, the processor 53 of the management server 5 finely adjusts the area of the unnecessary point groups 1440 selected by the user using the processing program related to the noise removal processing read from the storage processing management DB 5002. Specifically, the processor 53 expands or reduces the area of the unnecessary point groups 1440 selected by the user, adds or removes a particular point to or from the area of the unnecessary point groups 1440 selected by the user.

Subsequently, as in step S9, the setting unit 57 of the management server 5 generates an operation screen including the three-dimensional point groups 1430 and the unnecessary point groups 1440 whose area is finely adjusted according to the processing program. The transmitting and receiving unit 51 transmits operation screen information relating to the operation screen to the communication terminal (the terminal device 3).

The user checks the unnecessary point groups 1440 whose area is finely adjusted according to the processing program and operates the confirmation key 1300. In response to such operations from the user, the processor 53 of the management server 5 removes the unnecessary point groups 1440, whose area is finely adjusted according to the processing program, from the three-dimensional point groups 1430, and ends the noise removal processing.

Figure 10:
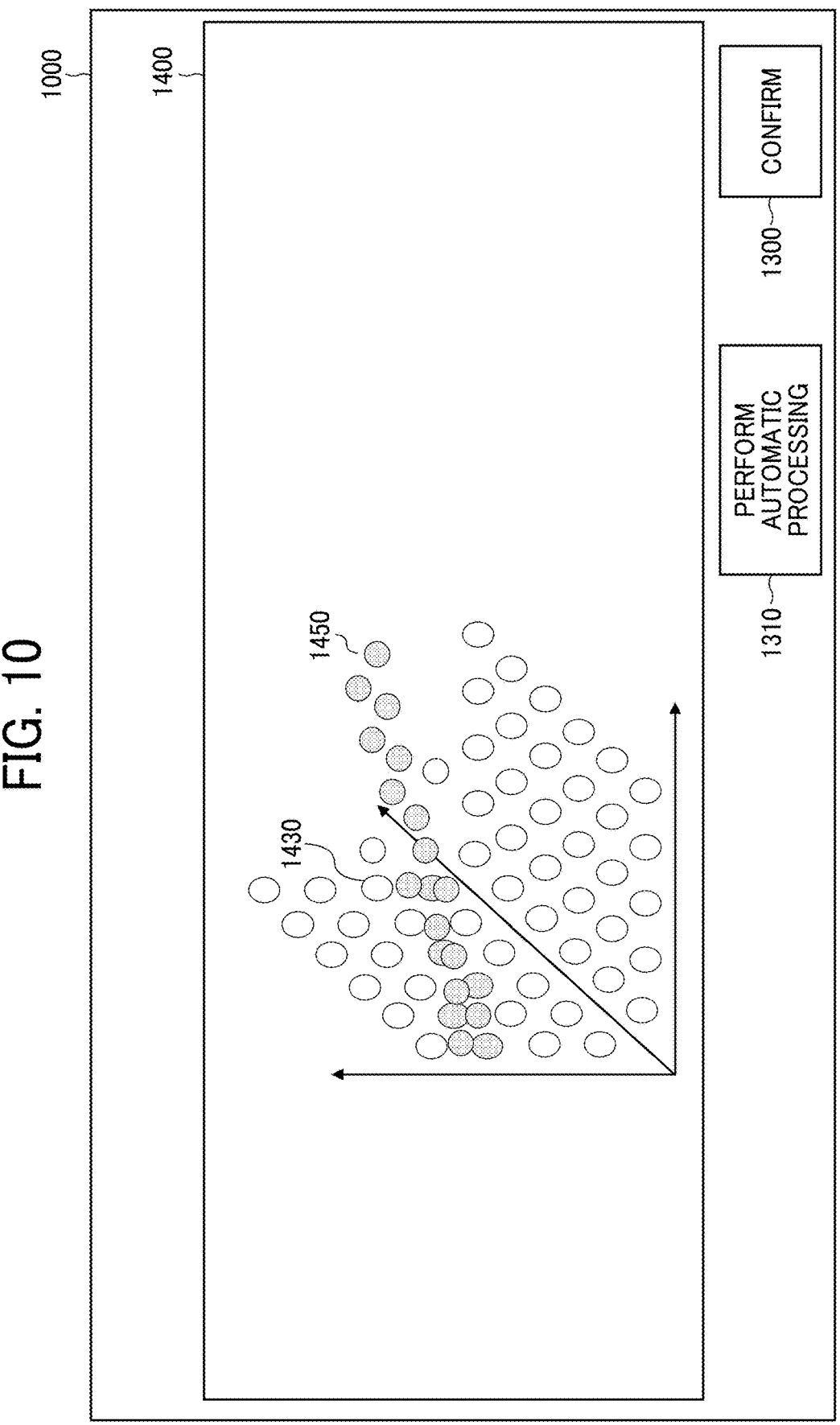
FIG. 10 is an illustration of a segmentation processing according to an embodiment of the present disclosure.

FIG. 10 is an illustration of a segmentation processing according to an embodiment of the present disclosure.

In FIG. 10, the display control unit 34 of the communication terminal (the terminal device 3) causes the display 308 to display three-dimensional point groups 1430 as two-dimensional or three-dimensional images on the operation screen 1400. On such a screen, the user operates a pointing device such as the mouse 312 to perform the segmentation processing in various manners as described below.

Manual Processing Only

In the segmentation processing, the user labels particular point groups within the three-dimensional point groups 1430 to form labeled point groups 1450 (black circles) and operates the confirmation key 1300. In response to such operations from the user, the receiving unit 32 of the communication terminal receives a predetermined input operation, which is input from the user to the operation screen displayed on the display 308.

Then, the processor 53 of the management server 5 checks the labeled point groups 1450 based on the operation input information included in the input information received in step S11, and ends the segmentation processing.

Manual Processing after Automatic Processing

In response to an operation on the automatic processing execution key 1310 by the user before inputting an operation to the operation screen 1400, the receiving unit 32 receives setting information for the automatic processing execution key 1310.

Then, based on the setting information included in the input information received in step S11, the processor 53 of the management server 5 labels particular point groups within the three-dimensional point groups 1430 and forms the labeled point groups 1450 (black dots) using the processing program related to the noise removal processing read from the storage processing management DB 5002.

Subsequently, as in step S9, the setting unit 57 of the management server 5 generates an operation screen including the three-dimensional point groups 1430 and the labeled point groups 1450 formed according to the processing program. The transmitting and receiving unit 51 transmits operation screen information relating to the operation screen to the communication terminal (the terminal device 3).

The user finely adjusts the labeled point groups 1450 formed according to the processing program and operates the confirmation key 1300. In response to such operations from the user, the processor 53 of the management server 5 confirms the labeled point groups 1450 finely adjusted by the user and ends the segmentation processing.

Automatic Processing after Manual Processing

In the segmentation processing, the user labels particular point groups within the three-dimensional point groups 1430 to form labeled point groups 1450 (black circles) and operates the automatic processing execution key 1310. In response to such operations from the user, the receiving unit 32 of the communication terminal receives a predetermined input operation, which is input from the user to the operation screen displayed on the display 308, and the setting information for the automatic processing execution key 1310.

Then, based on the operation input information and the setting information included in the input information received in step S11, the processor 53 of the management server 5 finely adjusts the point groups 1450 labeled and formed by the user, according to the processing program related to the segmentation processing read from the storage processing management DB 5002.

Subsequently, as in step S9, the setting unit 57 of the management server 5 generates an operation screen including the three-dimensional point groups 1430 and the labeled point groups 1450, which is finely adjusted according to the processing program. The transmitting and receiving unit 51 transmits operation screen information relating to the operation screen to the communication terminal (the terminal device 3).

The user checks the labeled point groups 1450, which is finely adjusted according to the processing program and operates the confirmation key 1300. In response to such operations from the user, the processor 53 of the management server 5 confirms the labeled point groups 1450, which is finely adjusted according to the processing program, and ends the segmentation processing.

Figure 11:
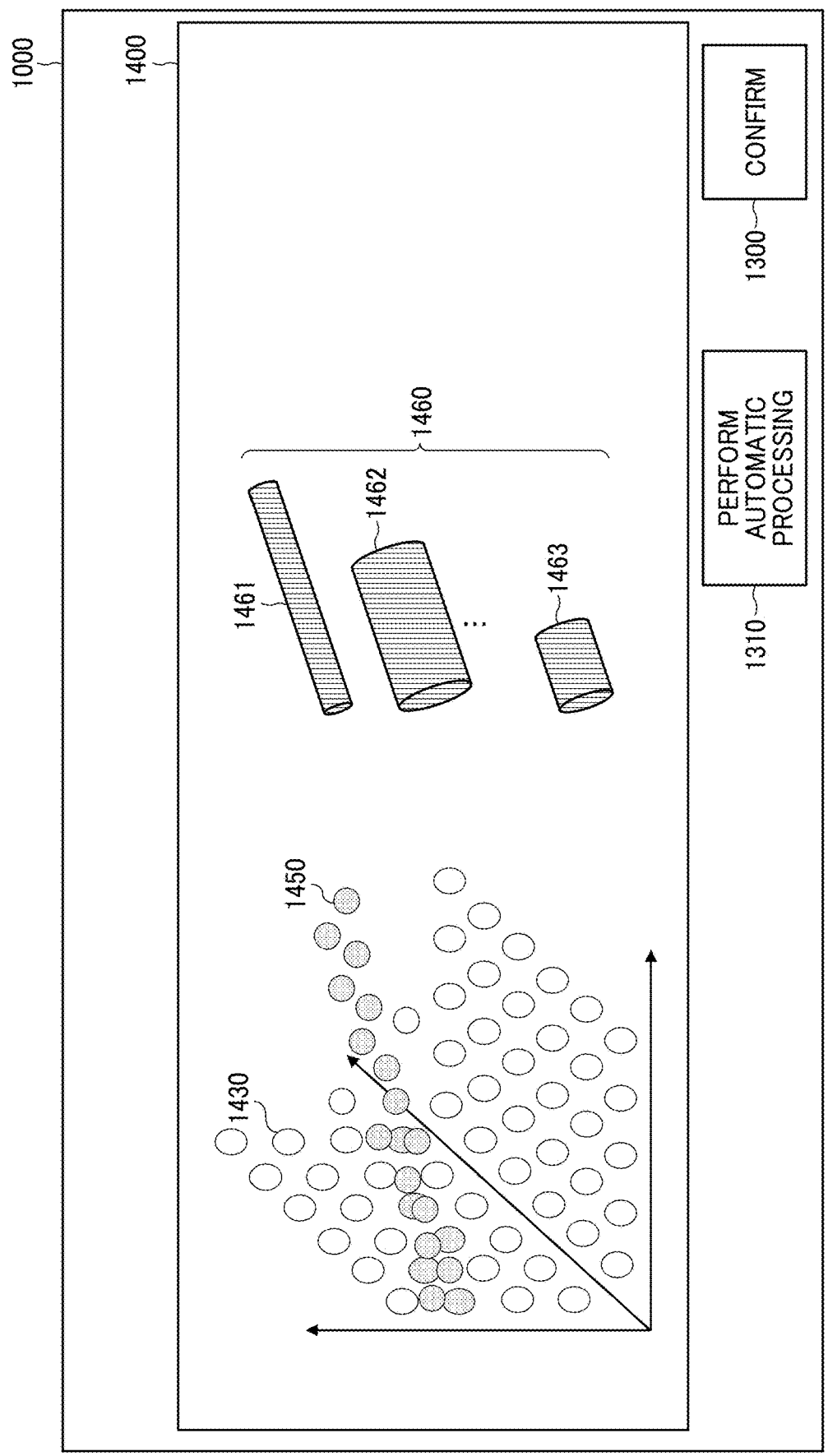
FIG. 11 is an illustration of a modeling process according to an embodiment of the present disclosure.

FIG. 11 is an illustration of a modeling process according to an embodiment of the present disclosure.

The modeling process is a process of collating a particular area within the three-dimensional point groups with a model shape and replacing the particular area with the model shape.

In FIG. 11, the display control unit 34 of the communication terminal (the terminal device 3) causes the display 308 to display, as two-dimensional or three-dimensional images, the three-dimensional point groups 1430 and model information 1460 including multiple model shapes 1461, 1462, and 1463 having different shapes on the operation screen 1400. On the operation screen 1400, the user operates the pointing device such as the mouse 312 to perform the modeling process in various manners as described below.

Manual Processing Only

In the modeling process, the user collates the labeled point groups 1450 within the three-dimensional point groups 1430 with the multiple model shapes 1461, 1462, and 1463 and selects, from the multiple model shapes 1461, 1462, and 1463, a model shape to be replaced with the particular area, and operates the confirmation key 1300. In response to such operations input from the user, the receiving unit 32 of the communication terminal receives a predetermined input operation, which is input from the user to the operation screen displayed on the display 308. When no optimum model shape is present among the multiple model shapes 1461, 1462, and 1463, the user may adjust the size and shape of the selected model shape. In the present disclosure, the processor 53 calculates a distance between points of the model shape and the point groups and determines, as the optimum model shape, a model shape for which the sum of distances between the model shape and the point groups is smallest among multiple model shapes.

Then, the processor 53 of the management server 5 replaces the labeled point groups 1450 with the model shape based on the operation input information included in the input information received in step S11, and ends the modeling process.

This allows the user to perform the modeling process while considering some point groups missing from a particular area within the three-dimensional point groups 1430 when such missing point groups are included in the particular area of the three-dimensional point groups 1430.

Specifically, when some point groups (i.e., a missing portion) are missing from the particular area within the three-dimensional point groups, and the particular area is divided into two areas, the processor 53 replaces the two areas with two model shape according to the processing program related to the modeling process, whereas the user regards the missing portion to include point groups and replaces the particular area with one model shape including the two areas.

Manual Processing after Automatic Processing

In response to an operation on the automatic processing execution key 1310 by the user before inputting an operation to the operation screen 1400, the receiving unit 32 receives setting information for the automatic processing execution key 1310.

Then, based on the setting information included in the input information received in step S11, the processor 53 of the management server 5 collates a particular area within the three-dimensional point groups 1430 with the multiple model shapes 1461, 1462, and 1463 and selects a particular model shape from among the multiple model shapes 1461, 1462, and 1463 according to the processing program related to the modeling process read from the storage processing management DB 5002.

Subsequently, as in step S9, the setting unit 57 of the management server 5 generates an operation screen including the three-dimensional point groups 1430 and the model shape selected according to the processing program. The transmitting and receiving unit 51 transmits operation screen information relating to the operation screen to the communication terminal (the terminal device 3).

The user finely adjusts the dimension or shape of the model shape selected according to the processing program, replaces the selected model shape with another model shape, and operates the confirmation key 1300. In response to such operations input from the user, the processor 53 of the management server 5 replaces the labeled point groups 1450 with the model shape on which a final adjustment is made by the user, and ends the modeling process.

Automatic Processing after Manual Processing

In the modeling process, the user collates the labeled point groups 1450 within the three-dimensional point groups 1430 with the multiple model shapes 1461, 1462, and 1463 and selects, from the multiple model shapes 1461, 1462, and 1463, a particular model shape to be replaced with the particular area, and operates the automatic processing execution key 1310. In response to such operations input from the user, the receiving unit 32 of the communication terminal receives a predetermined input operation, which is input from the user to the operation screen displayed on the display 308, and the setting information for the automatic processing execution key 1310.

Then, based on the operation input information and the setting information included in the input information received in step S11, the processor 53 of the management server 5 finely adjusts the dimension or shape of the model shape selected by the user, according to the processing program related to the modeling process read from the storage processing management DB 5002.

Subsequently, as in step S9, the setting unit 57 of the management server 5 generates an operation screen including the three-dimensional point groups 1430 and the model shape adjusted according to the processing program. The transmitting and receiving unit 51 transmits operation screen information relating to the operation screen to the communication terminal (the terminal device 3).

The user checks the model shape adjusted according to the processing program and operates the confirmation key 1300. In response to such operations input from the user, the processor 53 of the management server 5 replaces the labeled point groups 1450 with the model shape changed according to the processing program, and ends the modeling process.

Figure 12:
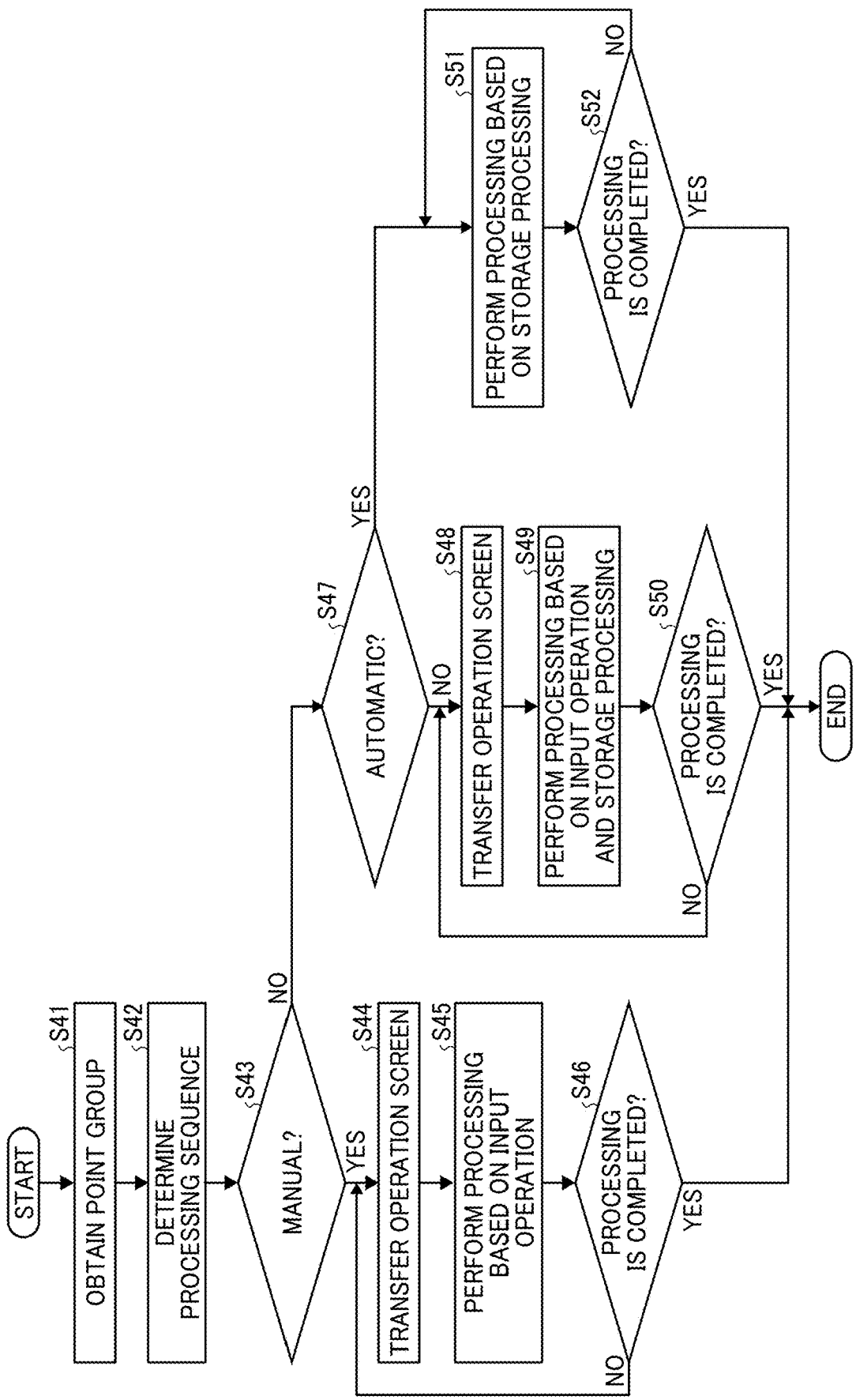
FIG. 12 is a flowchart of a process of generating a three-dimensional shape according to a first modification of an embodiment of the present disclosure.

FIG. 12 is a flowchart of a process of generating a three-dimensional shape according to a first modification of an embodiment of the present disclosure.

The process in FIG. 12 is an example of step S8 in FIG. 5 when the automatic processing collective setting box 1231, the manual processing collective setting box 1241, or the mixed processing collective setting box 1251 in the display screen 1000 in FIG. 6 is set.

The processor 53 of the management server 5 acquires the three-dimensional point group data read by the storing and reading unit 59 (step S41). The setting unit 57 determines ordinal numbers of the generation processing based on the execution order of the generation processing included in the processing setting information received in step S6 (step S42). The determination unit 55 determines whether the processing mode of the generation processing included in the processing setting information received in step S6 is the manual processing or not (step S43).

When the determination unit 55 determines that the processing mode is the manual processing (YES in step S43), the setting unit 57 of the management server 5 generates an operation screen that receives an input operation for generating three-dimensional shape information based on the ordinal numbers of the generation processing determined in step S42. The transmitting and receiving unit 51 transmits operation screen information relating to the operation screen to the communication terminal (the terminal device 3) (step S44).

The processor 53 of the management server 5 executes the generation processing with the ordinal numbers determined in step S42, based on the operation input information received in step S11 (step S45).

The determination unit 55 determines whether the generation processing has ended or not (step S46). When the determination unit 55 determines that the generation processing has not ended (NO in step S46), the process returns to step S44.

When determining the processing mode is not the manual processing in step S43 (NO in step S43), the determination unit 55 further determines whether the processing mode of the generation processing is the automatic processing (step S47).

When the determination unit 55 determines that the processing mode is not the automatic processing (NO in step S47), the setting unit 57 of the management server 5 generates an operation screen that receives an input operation for generating three-dimensional shape information based on the ordinal numbers of the generation processing determined in step S42. The transmitting and receiving unit 51 transmits operation screen information relating to the operation screen to the communication terminal (the terminal device 3) (step S48). In another example, instead of step S47, the determination unit 55 determines whether the processing mode of the generation processing is the mixed processing or not. When the determination unit 55 determines that the processing mode is the mixed processing, the process proceeds to step S48.

The processor 53 of the management server 5 executes the generation processing with the ordinal numbers determined in step S42, based on the operation input information received in step S11 and the processing program read from the storage processing management DB 5002, the processing program being stored in association with the process setting information (step S49).

The determination unit 55 determines whether the generation processing has ended or not (step S50). When the determination unit 55 determines that the generation processing has not ended (NO in step S50), the process returns to step S48.

When the determination unit 55 determines that the processing mode is the automatic processing (YES in step S47), the processor 53 executes the generation processing with the ordinal numbers determined in step S42, based on the processing program read from the storage processing management DB 5002, the processing program being stored in association with the processing setting information (step S51).

The determination unit 55 determines whether the generation processing has ended or not (step S52). When the determination unit 55 determines that the generation processing has not ended (NO in step S52), the process returns to step S51.

FIG. 13 is an illustration of a display screen according to another modification of an embodiment of the present disclosure.

A display screen 1000 in FIG. 13 differs from the display screen 1000 in FIG. 6 in that the automatic processing collective setting box 1231, the manual processing collective setting box 1241, the mixed processing collective setting box 1251, the registration processing ordinal number setting box 1262, the noise removal processing ordinal number setting box 1263, the segmentation processing ordinal number setting box 1264, and the modeling processing ordinal number setting box 1265 are not included in the processing setting screen 1220 in FIG. 13.

The process setting screen 1220 in FIG. 13 according to another modification is a screen that receives a processing setting operation for setting a processing mode for only one generation process of the registration processing, the noise removal processing, the segmentation processing, and the modeling process.

FIG. 14 is an illustration of a modeling process according to another modification of an embodiment of the present disclosure.

A display screen 1000 in FIG. 14 differs from the display screen 1000 in FIG. 11 in that the display screen 1000 in FIG. 14 includes a next processing key 1330. The next processing key 1330 is used to return to the display screen 1000 in FIG. 13.

In response to an operation on the next processing key 1330 by the user, the receiving unit 32 of the communication terminal receives setting information for the next processing key 1330.

The transmitting and receiving unit 31 transmits input information relating to the input operation received by the receiving unit 32 to the management server 5. The transmitting and receiving unit 51 of the management server 5 receives the input information transmitted from the communication terminal (the terminal device 3).

The setting unit 57 of the management server 5 generates a setting screen based on the setting information for the next process key 1330 included in the received input information. The transmitting and receiving unit 51 transmits setting screen information relating to the generated setting screen, to the communication terminal.

The transmitting and receiving unit 31 of the communication terminal (the terminal device 3) receives the setting screen information transmitted from the management server 5. The display control unit 34 causes the display 308 to display the setting screen in FIG. 13.

FIG. 15 is a flowchart of a process of generating a three-dimensional shape according to a second modification of an embodiment of the present disclosure.

The processor 53 of the management server 5 acquires the three-dimensional point group data read by the storing and reading unit 59 (step S61). The setting unit 57 determines a generation process to be performed based on the processing setting information received in step S6 (step S62).

The determination unit 55 determines whether the processing mode of the generation process included in the processing setting information received in step S6 is the manual processing or not (step S63).

When the determination unit 55 determines that the processing mode is the manual processing (YES in step S63), the setting unit 57 of the management server 5 generates an operation screen that receives an input operation for performing the generation process determined in step S62. The transmitting and receiving unit 51 transmits operation screen information relating to the operation screen to the communication terminal (the terminal device 3) (step S64).

The processor 53 of the management server 5 executes the generation process determined in step S62, based on the operation input information received in step S1 (step S65).

The determination unit 55 determines whether the setting information for the next processing key 1330 has been received or not (step S66). When the determination unit 55 determines that the setting information has not been received (NO in step S66), the determination unit 55 determines whether the generation process has ended or not (step S67). When the determination unit 55 determines that he generation process has not ended (NO in step S67), the process returns to step S65.

When the determination unit 55 determines whether the setting information for the next processing key 1330 has been received (YES in S66), the setting unit 57 generates the setting screen as illustrated in FIG. 13. The transmitting and receiving unit 51 transmits setting screen information relating to the generated setting screen, to the communication terminal (the terminal deice 3) (step S68).

When determining the processing mode is not the manual processing (NO in step S63), the determination unit 55 further determines whether the processing mode of the generation process is the automatic processing or not (step S69).

When the determination unit 55 determines that the processing mode is not the manual processing (NO in step S63), the setting unit 57 of the management server 5 generates an operation screen that receives an input operation for performing the generation process determined in step S62. The transmitting and receiving unit 51 transmits operation screen information relating to the operation screen to the communication terminal (the terminal device 3) (step S70). In another example, instead of step S69, the determination unit 55 determines whether the processing mode of the generation processing is the mixed processing or not. When the determination unit 55 determines that the processing mode is the mixed processing, the process proceeds to step S70.

The processor 53 of the management server 5 executes the generation process determined in step S42, based on the operation input information received in step S11 and the processing program read from the storage processing management DB 5002, the processing program being stored in association with the process setting information (step S62).

The determination unit 55 determines whether the setting information for the next processing key 1330 has been received or not (step S72). When the determination unit 55 determines that the setting information has not been received (NO in step S72), the determination unit 55 determines whether the generation process has ended or not (step S73). When the determination unit 55 determines that he generation process has not ended (NO in step S73), the process returns to step S70.

When the determination unit 55 determines that the setting information for the next processing key 1330 has been received (YES in step S72), the process proceeds to step S68.

When the determination unit 55 determines that the processing mode is the automatic processing (YES in step S69), the processor 53 executes the generation process determined in step S62, based on the processing program read from the storage processing management DB 5002, the processing program being stored in association with the processing setting information (step S74).

The determination unit 55 determines whether the setting information for the next processing key 1330 has been received or not (step S75). When the determination unit 55 determines that the setting information has not been received (NO in step S75), the determination unit 55 determines whether the generation process has ended or not (step S76). When the determination unit 55 determines that the generation process has not ended (NO in step S76), the process returns to step S74.

When the determination unit 55 determines that the setting information for the next processing key 1330 has been received (YES in step S76), the process proceeds to step S75.

As described above, a management server 5 serving as a three-dimensional shape generation apparatus according to an embodiment of the present disclosure includes a processor 53 serving as a three-dimensional information generation unit that performs one of first processing or second processing using point-group information indicating three-dimensional point groups as a generation processing based on an instruction operation received at an instruction reception screen (a confirmation key 1300), the instruction operation designating one of the first processing or the second processing. The three-dimensional information generation unit (the processor 53) performs all processes or a part of processes of the generation processing based on an operation input received at the instruction reception screen in response to the instruction operation designating the first processing. The three-dimensional information generation unit (the processor 53) performs all processes of the generation processing using a stored processing preliminarily stored in a memory without using the operation input received at the instruction reception screen in response to the instruction operation designating the second processing.

This configuration allows the skilled person to execute the first processing to generate desired three-dimensional shape information, and allows the non-skilled person to execute the second processing to easily generate three-dimensional shape information. This enables generation of three-dimensional shape information according to a user's level of skill and knowledge.

The management server 5 further includes a transmitting and receiving unit 51 serving as a transmitter that transmits instruction reception screen information to a communication terminal (a terminal device 3) communicable with the three-dimensional shape generation apparatus (the management server 5). The instruction reception screen information is used for the communication terminal (the terminal device 3) to display the instruction reception screen (the confirmation key 1300).

This configuration enables the management server 5 to generate three-dimensional shape information based on the instruction operation for designating the first processing or the second processing, which is received from the terminal device 3.

The transmitting and receiving unit 51 further transmits operation screen information to the communication terminal (the terminal device 3). The operation screen information is used for the communication terminal (the terminal device 3) to display an operation screen (an operation screen 1400) to receive the operation input.

This configuration enables the management server 5 to generate three-dimensional shape information based on the input operation received by the terminal device 3.

The three-dimensional information generation unit (the processor 53) performs one of the first processing or the second processing based on the instruction operation and a setting operation to set one of the first processing or the second processing, the setting operation received at a setting screen (a setting screen 1200) in the communication terminal (the terminal device 3).

This configuration allows the skilled person to set the first processing to generate desired three-dimensional shape information, and allows the non-skilled person to set the second processing and easily generate three-dimensional shape information. This enables generation of three-dimensional shape information according to a user's level of skill and knowledge.

The transmitting and receiving unit 51 further transmits setting screen information to the communication terminal (the terminal device 3). The setting screen information is used for the communication terminal to display the setting screen (a setting screen 1200).

This configuration allows the management server 5 to generate the three-dimensional shape information based on the setting operation for setting the first processing or the second processing, which is received by the terminal device 3.

The management server 5 further includes a setting unit 57 serving as a setting unit that sets the first processing or the second processing based on user information received from the terminal device 3 in which a receiving unit 32 serving as a user information receiver has received the user information. The processor 53 performs the first processing or the second processing based on an instruction operation for designating the first processing or the second processing received from the terminal device 3 and setting information for the first processing or the second processing set by the setting unit 57.

This configuration allows the first processing or the second processing to be set based on the user information and thus generates the three-dimensional shape information.

The first processing performs one of: the generation processing based on the operation input without using the stored processing, or the generation processing based on the operation input using the stored processing.

This configuration allows a skilled person for the entire generation processing (i.e., all the processes involved in generation processing) to perform the generation processing based on the operation input received from the terminal device 3 and without being based on the stored processing. Further, such a configuration allows a skilled person for a partial generation processing (i.e., some processes involved in the generation processing) to select processing based on the operation input or processing based on the stored processing according to whether a generation process to be processed is a process at which the skilled person is skilled. This enables generation of three-dimensional shape information according to a user's level of skill and knowledge among skilled people.

The processor 53 performs multiple generation processes for generating three-dimensional shape information, the multiple generation processes including registration processing, noise removal processing, segmentation processing, and modeling processing. The processor 53 performs the first processing or the second processing on at least one of the multiple generation processes based on an instruction operation received from the terminal device 3 that has received the instruction operation input from the user, the instruction operation for designating the first processing or the second processing.

This configuration enables each of multiple generation processes to be performed according to a user's level of skill and knowledge.

The processor 53 performs multiple generation processes for generating three-dimensional shape information, the multiple generation processes including registration processing, noise removal processing, segmentation processing, and modeling processing. The processor 53 performs multiple generation processes based on a setting operation for setting the ordinal numbers of the multiple generation processes and an instruction operation, which are received from the terminal device 3. The setting operation has been received by ordinal-number setting boxes 1262, 1263, 1264, and 1265 on a setting screen 1200 of the terminal device 3 This configuration allows the skilled person to perform multiple generation processes in a desired execution order.

The processor 53 performs multiple generation processes based on an execution order preliminarily stored in a setting information management DB 5001 and without being disposed on the setting operation.

This configuration allows the non-skilled person to easily perform multiple generation processes without setting the execution order.

The management server 5 further includes a storing and reading unit 59 serving as an updating unit that updates the stored processing based on history information about the first processing executed by the processor 53.

This configuration allows updating of the stored processing based on an operation input history of the skilled person, and thus increases the accuracy of generation of the three-dimensional shape in the second processing subsequently performed in response to an operation input by the non-skilled person.

The management sever 5 further includes a storing and reading unit 59 serving as a storage controller that stores the three-dimensional shape information in a storage unit such as the three-dimensional shape management DB 5004, the recording medium 506, or the CD-RW 513.

The transmitting and receiving unit 51 transmits the three-dimensional shape information to the terminal device 3. This enables the user of the terminal device 3 to check the three-dimensional shape information on the terminal device 3.

A three-dimensional shape generation system 1 includes a three-dimensional shape generation apparatus (a management server 5) configured to perform one of a first processing or a second processing to generate three-dimensional information using point group information indicating a three-dimensional point group as a generation processing based on an instruction operation received at an instruction operation screen (a confirmation key 1300), the instruction operation designating one of the first processing or the second processing; and a communication terminal (a terminal device 3) communicable with the three-dimensional shape generation apparatus (the management server 5). A transmitter (a transmission and reception 51) transmits, to the communication terminal (the terminal device 3), instruction reception screen information used for the communication terminal (the terminal device 3) to display the instruction reception screen (the confirmation key 1300). A display control unit 34 causes the communication terminal to display the instruction reception screen on a display 308 based on the instruction reception screen information transmitted to the communication terminal (the terminal device 3). A receiving unit 32 receives the instruction operation input to the instruction reception screen. A three-dimensional information generation unit (the processor 53) performs: all processes or a part of processes of the generation processing based on an operation input received at the instruction reception screen in response to the instruction operation designating the first processing; and all processes of the generation processing using a stored processing previously stored in a memory without using the operation input received at the instruction reception screen in response to the instruction operation designating the second processing. The transmitter (51) and the three-dimensional information generation unit (53) are included in the three-dimensional shape generation apparatus (5). The transmitter (the transmitting and receiving unit 51) and the three-dimensional information generation unit (the processor 53) are included in the three-dimensional shape generation apparatus (the management server 5), and the receiving unit 32 and the display control unit 34 are included in the communication terminal (the terminal device 3).

A three-dimensional shape generating method according to an embodiment includes: transmitting, to the terminal device 3, instruction reception screen information indicating a confirmation key 1300 (an instruction reception screen) that receives an instruction operation for designating first processing or second processing (S9), the first processing to perform all the processes or some processes involved in generation processing based on an operation input from a user, and the second processing to perform the generation processing based on a stored processing preliminarily stored in a database and without being based on the operation input (step S4); receiving instruction operation information indicating the instruction operation and point-group information indicating three-dimensional point groups from the terminal device 3 in which the confirmation key 1300 has received the instruction operation input by the user (step S6); receiving the operation input from the terminal device 3 (step S11); and performing the first processing or the second processing based on the instruction operation received, to generate three-dimensional shape information based on the point-group information (step S8). The instruction operation in the performing of the first processing or the second processing (S8) has been received by the instruction reception screen (the confirmation key 1300). In other words, a three-dimensional shape generating method includes: receiving instruction operation information indicating an instruction operation designating one of first processing or second processing to generate three-dimensional shape information using point-group information indicating three-dimensional point groups as a generation processing (S6); and performing all processes or a part of processes of the generation processing based on an operation input received at the instruction reception screen in response to the instruction operation designating the first processing, and performs all processes of the generation processing using a stored processing previously stored in a memory without using the operation input received at the instruction reception screen in response to the instruction operation designating the second processing.

A three-dimensional shape generating method according to another embodiment includes: receiving point-group information indicating three-dimensional point groups and instruction operation information indicating an instruction operation for designating first processing or second processing from the terminal device 3 in which the confirmation key 1300 has received the instruction operation input by the user (step S6), the first processing to perform all the processes or some processes involved in generation processing based on an operation input from the terminal device 3, and the second processing to perform the generation processing based on preliminarily stored processing and without being based on the operation input; receiving the operation input from the terminal device 3 (step S11); and performing the first processing or the second processing based on the instruction operation received, to generate three-dimensional shape information based on the point-group information (step S8).

A recording medium storing program according to an embodiment of the present disclosure causes a computer to execute the above-described three-dimensional shape generation method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A three-dimensional shape generation apparatus, comprising:
   circuitry configured to
      display an instruction reception screen including:
         information identifying each generation process of a plurality of generation processes;
         process selection options for each generation process, the process selection options including options for first processing and second processing, the first processing including a manual processing and a mixed processing and the second processing including an automatic processing; and
         a sequence order input box for each generation process;
      receive an instruction operation via the instruction reception screen, the instruction operation designating one of the first processing or the second processing for one or more generation process of the plurality of generation processes and designating an execution order via the sequence order input boxes; and
      perform a generation processing based on the instruction operation to generate three-dimensional shape information using point-group information indicating three-dimensional point groups, wherein
   in a case that the instruction operation indicates at least one of generation processes with the first processing, the circuitry performs the one or more generation processes of the generation processing based on the instruction operation input received at the instruction reception screen and according to the execution order, and
   in a case that the instruction operation indicates the plurality of generation processes with the second processing, the circuitry performs all generation processes of the generation processing using a stored processing previously stored in a memory and according to a stored execution order without using any operation input received at the instruction reception screen.

2. The three-dimensional shape generation apparatus according to claim 1, wherein
   the circuitry is further configured to transmit instruction reception screen information to a communication terminal communicable with the three-dimensional shape generation apparatus, and
   the communication terminal to displays the instruction reception screen according to the instruction reception screen information.

3. The three-dimensional shape generation apparatus according to claim 2, wherein
   the circuitry further transmits operation screen information to the communication terminal, and
   the communication terminal displays an operation screen, according to the operation screen information, to receive an operation input.

4. The three-dimensional shape generation apparatus according to claim 1, wherein the circuitry is further configured to receive a setting operation to set one of the first processing or the second processing, the setting operation input via a setting screen.

5. The three-dimensional shape generation apparatus according to claim 4, wherein
   the circuitry further transmits setting screen information to a communication terminal, and
   the communication terminal displays the setting screen according to the setting screen information.

6. The three-dimensional shape generation apparatus according to claim 1, wherein in the case that the instruction operation indicates the at least one of generation processes with the first processing the circuitry performs the one or more generation processes of the generation processing based on the operation input and the stored processing.

7. The three-dimension shape generation apparatus according to claim 1, wherein
   in the case that the instruction operation indicates the at least one of generation processes with the first processing the circuitry performs the one or more generation processes of the generation processing according to a preliminarily stored execution order.

8. The three-dimension shape generation apparatus according to claim 1, wherein in the case that the instruction operation indicates the at least one of generation processes with the first processing, the circuitry performs the one or more generation processes of the circuitry is further configured to update the stored processing based on history information stored during performance of the one or more generation processes.

9. The three-dimensional shape generation apparatus according to claim 1, further comprising the memory which stores the three-dimensional shape information.

10. The three-dimensional shape generation apparatus according to claim 1, wherein the circuitry is further configured to transmit the three-dimensional shape information to a communication terminal.

11. A three-dimensional shape generation system, comprising:
   a three-dimensional shape generation apparatus including circuitry; and
   a communication terminal communicable with the three-dimensional shape generation apparatus, wherein
   the circuitry of the three-dimensional shape generation apparatus is configured to:
      transmit, to the communication terminal, instruction reception screen information to control the communication terminal to display an instruction reception screen including:
         information identifying each generation process of a plurality of generation processes;
         process selection options for each generation process, the process selection options including options for first processing and second processing, the first processing including a manual processing and a mixed processing and the second processing including an automatic processing; and
         a sequence order input box for each generation process;

receive, from the communication terminal, an instruction operation input-to via the instruction reception screen, the instruction operation designating one of the first processing or the second processing for one or more generation process of the plurality of generation processes and designating an execution order via the sequence order input boxes; and perform a generation processing based on the instruction operation to generate three-dimensional shape information using point-group information indicating three-dimensional point groups, wherein in a case that the instruction operation indicates at least one of generation processes with the first processing, the circuitry performs the one or more generation processes of the generation processing based on the instruction operation received at the instruction reception screen and according to the execution order, and in a case that the instruction operation indicates the plurality of generation processes with the second processing, the circuitry performs all generation processes of the generation processing using a stored processing previously stored in a memory and according to a stored execution order without using any operation input received at the instruction reception screen.

12. A three-dimensional shape generating method, comprising:

displaying an instruction reception screen including:
information identifying each generation process of a plurality of generation processes;
process selection options for each generation process, the process selection options including options for first processing and second processing, the first processing including a manual processing and a mixed processing and the second processing including an automatic processing; and
a sequence order input box for each generation process;

receiving, by circuitry, an instruction operation via an instruction reception screen, the instruction operation designating one of the first processing or the second processing for one or more generation process of the plurality of generation processes and designating an execution order via the sequence order input boxes; and performing, by the circuitry, a generation processing based on the instruction operation to generate three-dimensional shape information using point-group information indicating three-dimensional point groups, wherein in a case that the instruction operation indicates at least one of generation processes with the first processing, the performing includes performing the one or more generation processes of the generation processing based on the instruction operation received at the instruction reception screen and according to the execution order, and in a case that the instruction operation indicates the plurality of generation processes with the second processing, the performing includes performing all generation processes of the generation processing using a stored processing previously stored in a memory and according to a stored execution order without using any operation input received at the instruction reception screen.

13. The three-dimensional shape generating method according to claim 12, further comprising:

transmitting instruction reception screen information to a communication terminal wherein
the communication terminal displays the instruction reception screen according to the instruction reception screen information.

14. A non-transitory recording medium storing multiple instructions executable by one or more processors to cause the processors to perform the method according to claim 12.

* * * * *